United States Patent [19]
Minakawa

[11] Patent Number: 6,101,572
[45] Date of Patent: Aug. 8, 2000

[54] DATA TRANSFER SYSTEM

[75] Inventor: Takashi Minakawa, Yokohama, Japan

[73] Assignee: Canon Kabushiki Kaisha, Tokyo, Japan

[21] Appl. No.: 08/076,929

[22] Filed: Jun. 16, 1993

Related U.S. Application Data

[63] Continuation of application No. 07/700,053, May 8, 1991, abandoned, which is a continuation of application No. 07/418,995, Oct. 10, 1989, abandoned, which is a continuation of application No. 06/658,757, Oct. 9, 1984, abandoned.

[30] Foreign Application Priority Data

Oct. 12, 1983 [JP] Japan .................................. 58-189182
Oct. 12, 1983 [JP] Japan .................................. 58-189183
Oct. 12, 1983 [JP] Japan .................................. 58-189184

[51] Int. Cl.$^7$ ...................................................... G06F 12/00
[52] U.S. Cl. .......................... 711/100; 711/200; 345/501; 712/1
[58] Field of Search ..................................... 395/800, 400, 395/425, 427, 800.01, 501; 711/100, 200

[56] References Cited

U.S. PATENT DOCUMENTS

| | | | |
|---|---|---|---|
| Re. 31,200 | 4/1983 | Sukonick et al. | 364/900 |
| 2,853,698 | 9/1958 | Nettleton et al. | 364/200 |
| 3,168,723 | 2/1965 | Foin et al. | 364/200 |
| 3,887,799 | 6/1975 | Lindgren | 235/164 |
| 4,075,689 | 2/1978 | Berkling | 364/200 |
| 4,079,458 | 3/1978 | Rider et al. | 364/900 |
| 4,084,261 | 4/1978 | Laker et al. | 364/900 |
| 4,107,773 | 8/1978 | Gilbreath et al. | 364/200 |
| 4,130,868 | 12/1978 | Heuer et al. | 364/200 |
| 4,141,068 | 2/1979 | Mager et al. | 364/DIG. 1 |

(List continued on next page.)

FOREIGN PATENT DOCUMENTS 2813080  10/1978  Germany .

OTHER PUBLICATIONS

Microprocessors And Microcomputer Development Systems: Designing Microprocessor–Based Systems, by Rafiquzzaman, pp. 76–98, 1984.

IBM Technical Disclosure Bulletin, vol. 18, No. 8, Jan. 1976, "Shift Register System for Image Orientation", by Gold et al pp. 2633–2639.

Advanced Micro Devices, "The Am2900 Family Data Book With Related Support Circuits", 1978, pp. 2–3 to 2–9, 2–30 to 2–36.

Microprocessors/Microcomputers, Adi Khambata, John Wiley & Sons, 1982, pp. 84–88.

Primary Examiner—Meng-Ai T. An
Assistant Examiner—Walter D. Davis, Jr.
Attorney, Agent, or Firm—Fitzpatrick, Cella, Harper & Scinto

[57] ABSTRACT

A data transfer system includes a memory having first and second memory areas for storing information and being identified by different addresses, first and second address memories for storing the address of the first and second memory areas, and a central processing unit for reading information from the first memory area on the basis of the address stored in the first address memory. The central processing unit also writes new information in the first memory area on the basis of the address stored in the first address memory, and also stores the information read from the first memory area in the second memory area on the basis of the address stored in the second address memory. In addition, the second memory area can have a portion called a common area, in common with the first memory area. The central processing unit can read information from the first memory area including this common area on the basis of the address in the first address memory. The central processing unit can also cause the memory to store the read information in the second memory area, on the basis of the address, different from the address of the common area in the first memory area, in the second address memory.

17 Claims, 20 Drawing Sheets

U.S. PATENT DOCUMENTS

| | | | |
|---|---|---|---|
| 4,286,329 | 8/1981 | Goertzel et al. | 364/900 |
| 4,303,948 | 12/1981 | Arai et al. | 358/444 |
| 4,334,246 | 6/1982 | Saran | 364/900 |
| 4,370,641 | 1/1983 | Kantor et al. | 340/146.3 |
| 4,373,194 | 2/1983 | Demke et al. | 364/900 |
| 4,424,587 | 1/1984 | Wevelsiep et al. | 382/44 |
| 4,437,121 | 3/1984 | Taylor et al. | 382/46 |
| 4,453,227 | 6/1984 | Amann et al. | 364/900 |
| 4,475,176 | 10/1984 | Ishii | 364/DIG. 2 |
| 4,511,962 | 4/1985 | Machida et al. | 395/492 |
| 4,636,783 | 1/1987 | Omachi | 382/46 |
| 4,652,991 | 3/1987 | Yamano | 395/411 |
| 4,706,213 | 11/1987 | Bandai | 340/724 |
| 4,809,345 | 2/1989 | Tabata et al. | 382/47 |

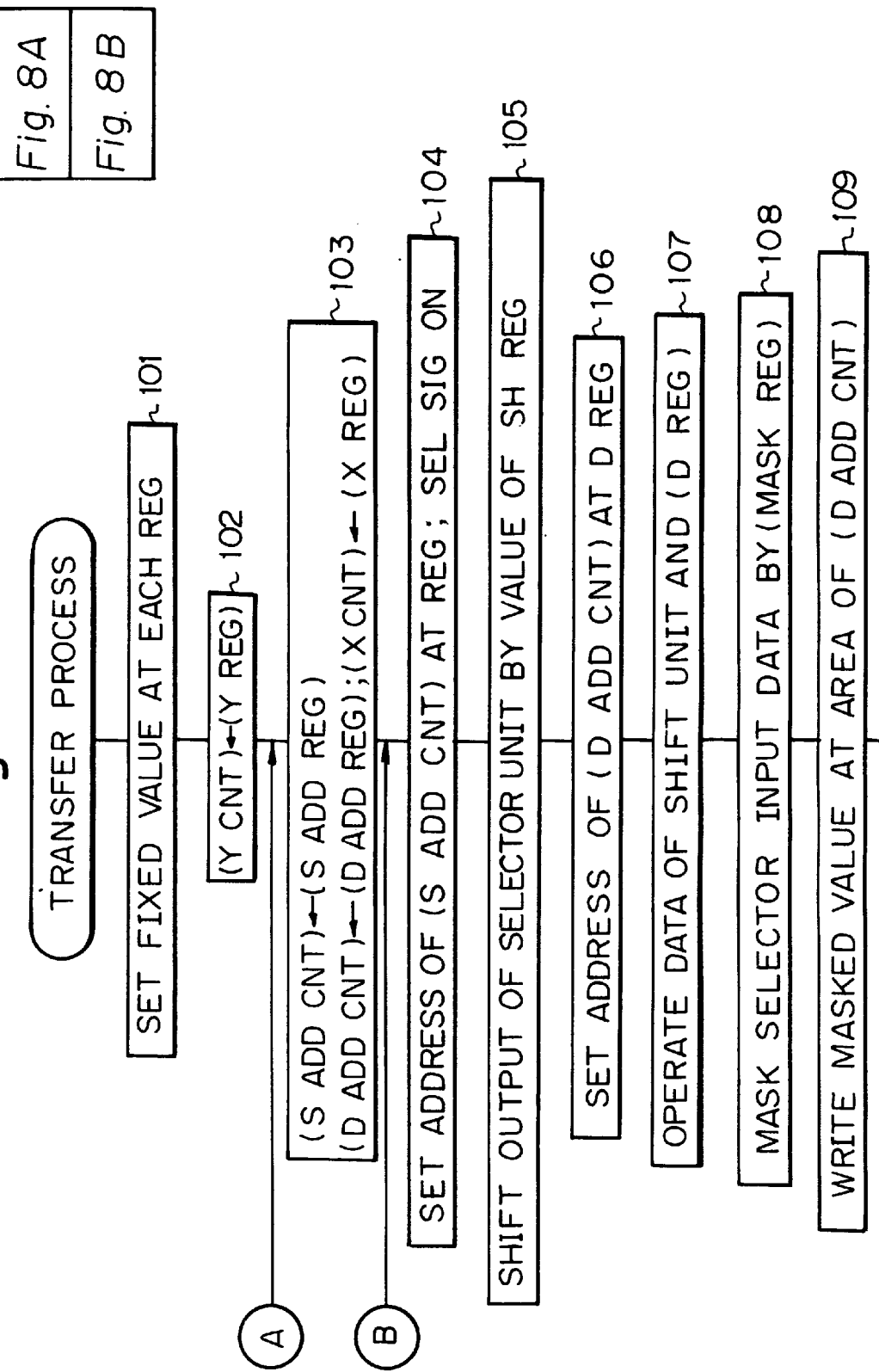

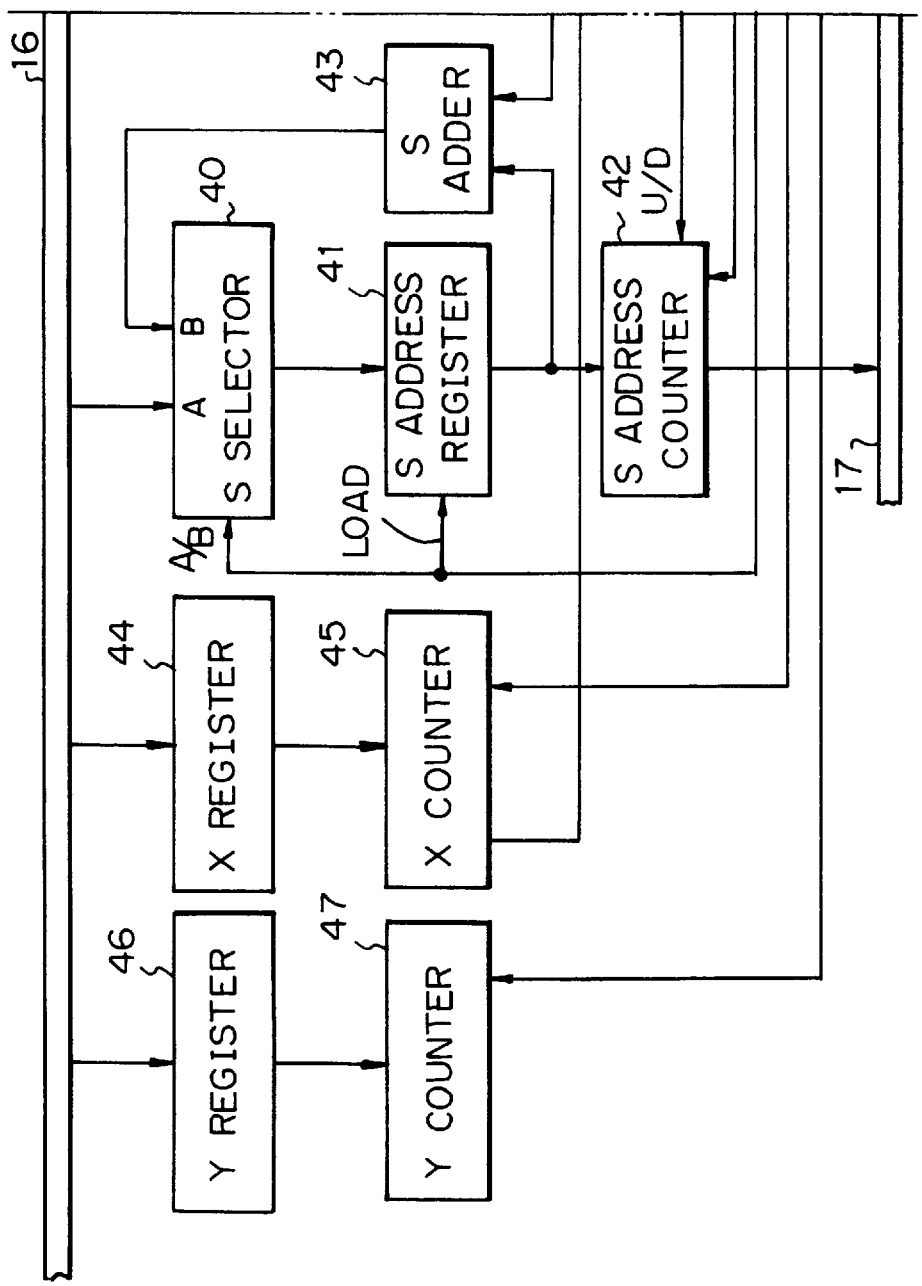

| Fig.12A | Fig.12B |

START
101 — SW SIG ON, SET ADD/SUB SIG AT SUB, SET U/D SIG AT D
102 — SET FIXED VALUE AT EACH REG
103 — SET EACH REG VALUE AT EACH CNT
104 — SET ADDRESS OF (S ADD CNT) AT S REG
105 — OUTPUT SWAPPED VALUE OF S REG BY S SWAP CKT
106 — SHIFT OUTPUT OF S SWAP CKT BY SH REG
107 — SET ADDRESS OF (D ADD CNT) AT D REG
109 — OPERATE OUTPUTS OF SHIFT UNIT AND D REG AT FUNCTION UNIT BY (FUNCTION REG)

A

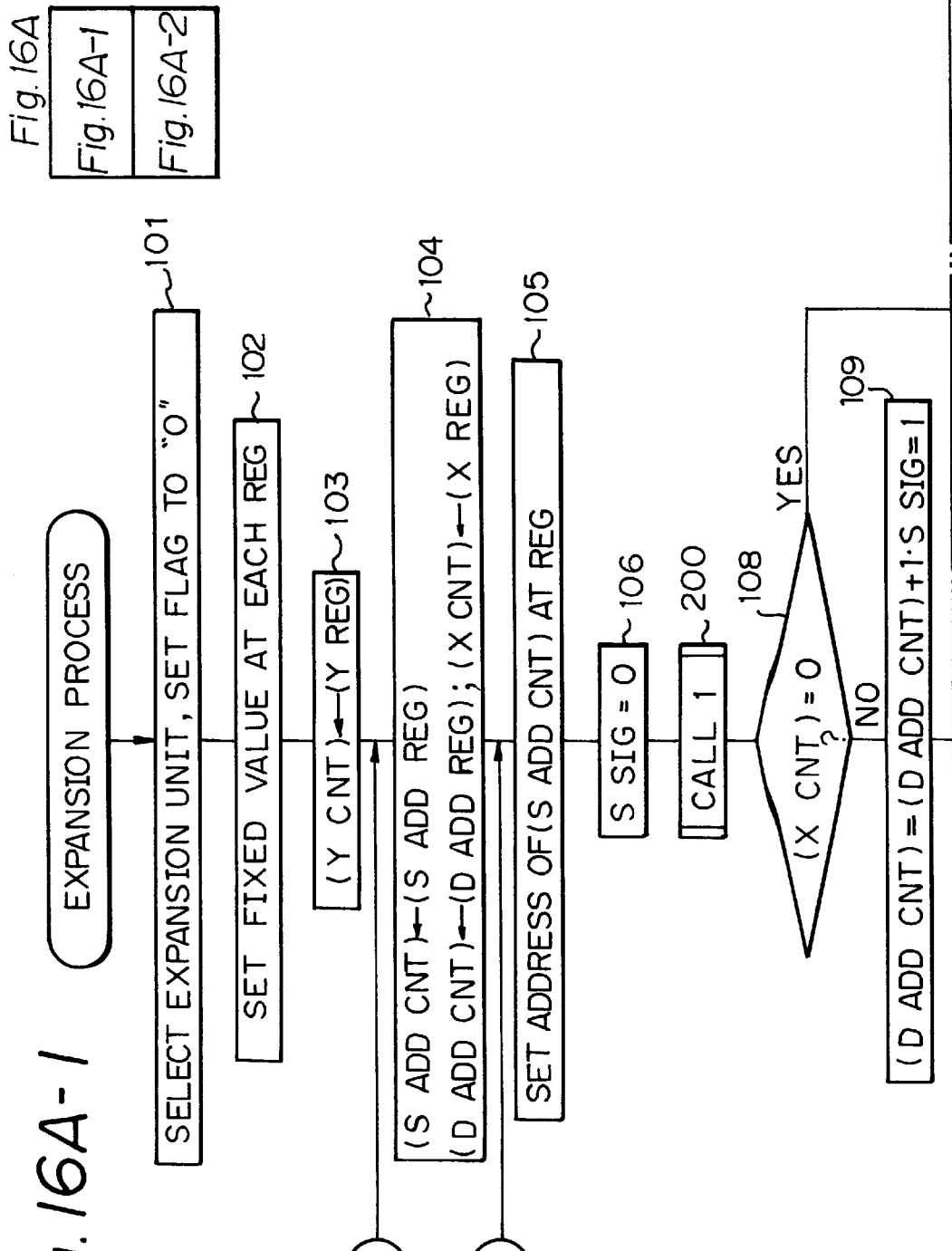

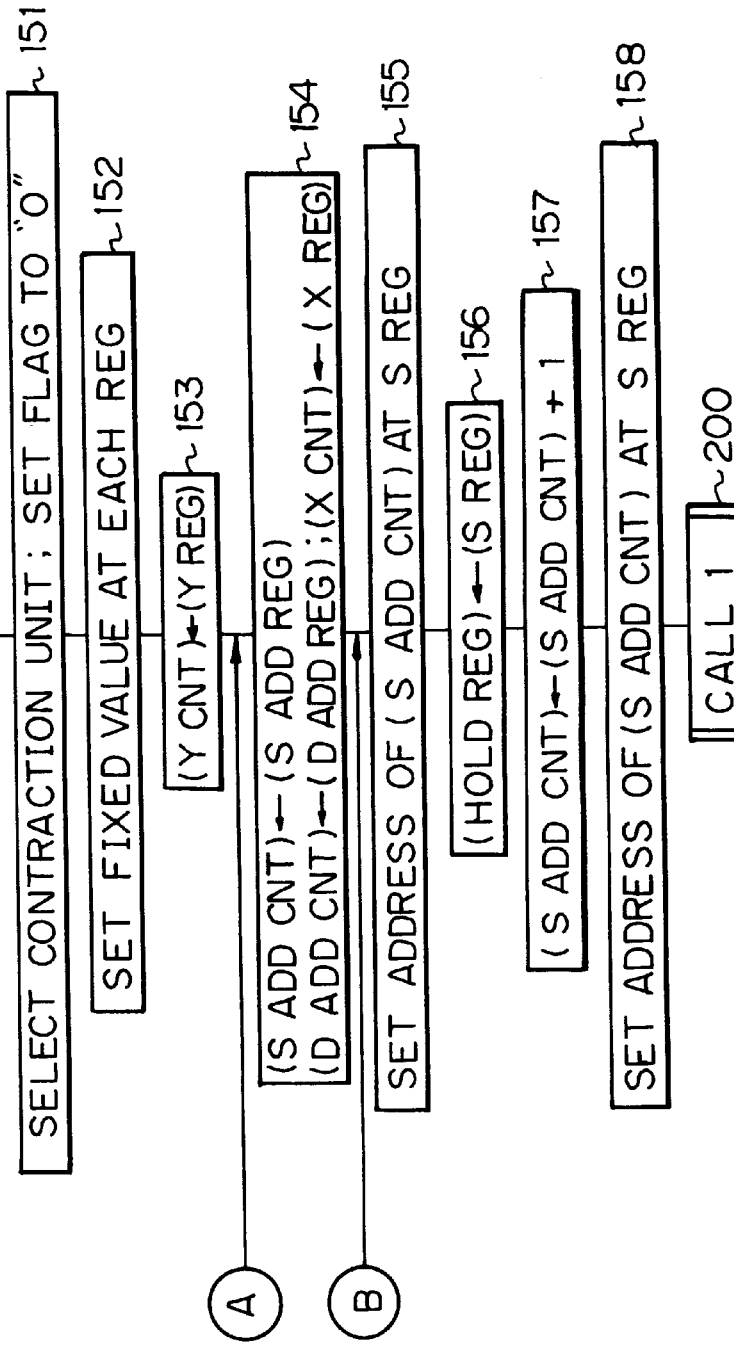

DATA TRANSFER SYSTEM

This application is a continuation-in-part of application Ser. No. 07/700,053 filed May 8, 1991, now abandoned, which is a continuation of application Ser. No. 07/418,995 filed Oct. 10, 1989, now abandoned, which is a continuation of U.S. patent Application Ser. No. 06/658,757 filed Oct. 9, 1984, which is now abandoned.

BACKGROUND OF THE INVENTION

1. Field of the Invention

This invention relates to a data transfer system for transferring data stored in a particular memory area in memory means to another memory area.

2. Description of the Prior Art

Heretofore, in an information processing apparatus or the like, when a rectangular area 2 toward SADD in the memory area in a memory unit 1, as shown, for example, in FIG. 1 of the accompanying drawings is to be transferred to a rectangular area 3 DADD, the transfer control shown below has been effected.

Referring to FIG. 2 of the accompanying drawings which is a block diagram of an information processing apparatus having a data transferring function, reference numeral 1 designates a memory unit, reference numeral 10 denotes a transfer control unit for controlling the address of the memory unit 1 during data transfer and the read-out/written-in data, reference numeral 11 designates a data control section for controlling the data in the transfer control unit, and reference numeral 12 denotes an address control section for controlling the address in the transfer control unit 10. Reference numeral 13 designates a central processing unit, and reference numeral 14 denotes an input/output unit.

The details of the data control section 11 are shown in FIG. 3 of the accompanying drawings.

In FIG. 3, reference numeral 20 designates an S register for storing therein the data read out from the rectangular area 2, reference numeral 25 denotes a shift unit for shifting the contents of S register 20 in accordance with the value of SH register 26, reference numeral 27 denotes a function register in which the logical operation (logical product, logical sum, exclusive logical sum, etc.) command for a function unit 30 is stored, reference numeral 28 designates a mask register, reference numeral 29 denotes a D register for storing therein the data read out from the rectangular area 3, reference numeral 30 designates a function unit for logically operating the values from the S register 20 and the D register 29 in accordance with a command indicated by the aforementioned function register, and reference numeral 31 denotes a selector for masking the output data from the function unit 30 and the output data from D register 29 by the masking information from the mask register 28 and outputting the same and writing the same into the rectangular area 3. This is for eliminating any unnecessary bits of the data read out from the memory unit 1 in a byte unit (or a word unit) by applying a mask thereto in order to effect data transfer in individual byte units.

A detailed block diagram of the address control section 12 is shown in FIG. 4 of the accompanying drawings.

In FIG. 4, reference numeral 40 designates an S selector, reference numeral 41 denotes an S address register for showing the read-out starting address of each line of the rectangular area 2, reference numeral 42 designates an S address counter for showing the memory access address of the rectangular area 2 of the memory unit 1 on the basis of the value of the S address register 41, reference numeral 43 denotes an S adder, reference numeral 44 designates an X register for showing the lateral length X of the rectangular area, reference numeral 45 denotes an X counter for detecting the termination of the transfer of the data corresponding to the lateral length X, reference numeral 46 designates a Y register for showing the vertical length Y of the rectangular area, reference numeral 47 denotes a Y counter for detecting the termination of the transfer of the data corresponding to the vertical length Y, namely, the termination of the transfer of all data, reference numeral 48 designates a timing circuit for effecting the read-out timing control of the memory unit 1, reference numerals 49 and 54 denote a SP register and a DP register, respectively, for showing the length of one line of the memory unit 1, reference numeral 50 designates a D selector, reference numeral 51 denotes a D address register for showing the read-out starting address of each line of the rectangular area 3, reference numeral 52 designates a D address counter for showing the memory access address of the rectangular area 3, and reference numeral 53 denotes a D adder.

In the above-described construction, when the rectangular area 2 of X bits laterally and Y bits vertically from the SADD address in the memory space, shown in FIG. 1, is to be moved to the rectangular area 3 of X bits laterally and Y bits vertically Y from DADD address, [SADD] is set at S address register 41 from the central processing unit 13 or the like through S selector 40 and the bit number X is set at X register 44, the bit number Y is set at Y register 46 and [DADD] is stored in D address register 51 through D selector 50, the length P corresponding to one line of the memory unit 1 is stored in SP register 49 and DP register 54 and, where shifting of data is necessary, the shift number is stored in SH register 26 and data transfer is effected.

Thereby, the transfer control unit 10 sets the value of S address register 41 at S address counter 42, the value of X register 44 at X counter 45, the value of Y register 46 at Y counter 47, and the value of D address register 51 at D address counter 52.

Then, the data in the rectangular area 2 shown by the address indicated by S address counter 42 (hereinafter referred to as S-DATA) is first read out and stored in S register 20. Also, the contents of the address in the rectangular area 3 shown by D address counter 52 (hereinafter referred to as D-DATA) is stored in D register 29.

In the data control section 11, the S-DATA stored in S register 20 is shifted by shift unit 25 by an amount designated by SH register 26 as required, and this shifted value and the D-DATA stored in the D register are logically operated in the function unit by the designation of the function register 27. This logically operated data (SD-DATA) and D-DATA are selected by mask register 28 and are output as the data written into the rectangular area 3 from the selector 31, and are written into the address designated by D address counter 52. The masking by the mask register 28 and the shifting by the shift unit 25 are for making part of the read-out D-DATA directly effective when the first and last bit positions of each line of the rectangular area 3 are not coincident with the byte or word boundary of the start bit position of the transferred data from the rectangular area 2. A conceptional view of this case is shown in FIG. 5 of the accompanying drawings. As shown there, the difference in bit position between S-DATA and D-DATA is modified.

Thus, the content of the address shown by S address counter 42 is logically operated in accordance with address shown by D address counter 52, and bit alignment and transfer has been effected. Therefore, S address counter 42 is counted up by the timing circuit 48 and X counter is also counted down by a predetermined number. At the same time, D address counter 52 is counted up by the timing circuit 48. Then, the transfer of the contents of the addresses shown by S address counter 42 and D address counter 52 is effected.

When the transfer of successive data is effected and the transfer of one lateral line is terminated, the X counter 45 becomes "0". By [X counter] =0, a value obtained by adding the value of SP register 49 to the value of S address register 41 with the aid of S adder 43 is stored in S address register 41 through S selector 40 and Y counter 47 is counted down by one. By this process, the first address of the rectangular area 2 of the next line is set at S address register 41. Then the value of this S address register 41 is set at S address counter 42 and the value of X register 44 is again set at X counter 45. Likewise, the values of D address register 51 and DP register 54 are added together by D adder 53 and the sum thereof is stored in D address register 51 through D selector 50, and the value of D address register 51 is set at D address counter 52.

Thus, the transfer of the data of the next line is started.

The above-described process is repeated and when the value of Y counter 47 becomes "0", the transfer of the rectangular area is terminated.

(1) Heretofore, the data transfer, as described above, has only been effected and the content of the rectangular area 2 has been left as is. Therefore, for example, where the memory unit 1 is a display memory such as a display device, when the display corresponding to the rectangular area 2 which is to be transferred to the rectangular area 3, the data of the rectangular area 2 must be newly eliminated after the data transfer has been effected, and this leads to complication of the process increased processing time.

(2) Also, where the rectangular area 2b of the transfer origin and the rectangular area 3b of the transferee have a common memory area, as shown in FIG. 6 of the accompanying drawings, transfer has been impossible and it has been necessary that the data of the rectangular area 2b be once retracted into another memory area and the transfer of data from the other memory area to the rectangular area 3b must be newly effected.

(3) Heretofore, the data transfer as described above has only been effected and for example, a data input from an input device is stored in the rectangular area 2 and when this stored data is to be output to an output device, the data is first transferred to the rectangular area 3 and the output device transfers the data to this rectangular area 3, and the output device effects outputting of the data from this rectangular area 3.

In this case, in the output device, the necessity of outputting the input data while expanding or contracting it sometimes occurs. However, this expansion or contraction process must be effected discretely from the data transfer process with the content of the rectangular area 3 being read out, and this has led to increased processing time and complexity.

SUMMARY OF THE INVENTION

The present invention has been made in view of the above-noted disadvantages peculiar to the prior art and an object thereof is to propose a data transfer system which transfers the information stored in a particular memory area of memory means to another memory area and which enables a particular memory area of the transfer origin to be rewritten by arbitrary data and enables the memory area of the data transfer origin to be rewritten with the transfer of the data.

It is another object of the present invention to eliminate the above-noted disadvantages peculiar to the prior art and to propose a data transfer system which enables the transfer starting position at which the transfer of the data of a memory area for effecting the transfer of the data to be selected at a position whereat the transferred data is not last by the transfer of the data, whereby even when the data transfer origin and the transferee are stored in a common position of the memory, the transfer of the data is carried out from the common portion to thereby enable the data to be transferred without any error.

It is still another object of the present invention to eliminate the above-noted disadvantage peculiar to the prior art and to propose a data transfer system which enables transferred data to be expanded or contracted simultaneously with the transfer of the data from a particular memory area of a memory unit to other memory area.

BRIEF DESCRIPTION OF THE DRAWINGS

FIGS. 11A and 11B show the data reading-out state of the apparatus according to the present embodiment, FIG. 12 composed of FIGS. 12A and 12B is a data transfer control flow chart in which data transfer is started from the right lower position of the rectangular area of the apparatus according to the present embodiment, FIGS. 15A, 15B and 15C illustrate an example of the working of the data during data transfer, FIG. 16A composed of FIGS. 16A-1 and 16A-2 and FIG. 16B are flow charts showing the data expansion process during data transfer, and FIG. 17 composed of FIGS. 17A and 17B is a flow chart showing the data contraction process during data transfer.

DESCRIPTION OF THE PREFERRED EMBODIMENTS

An embodiment of the present invention will hereinafter be described by reference to the drawings.

Figure 2:
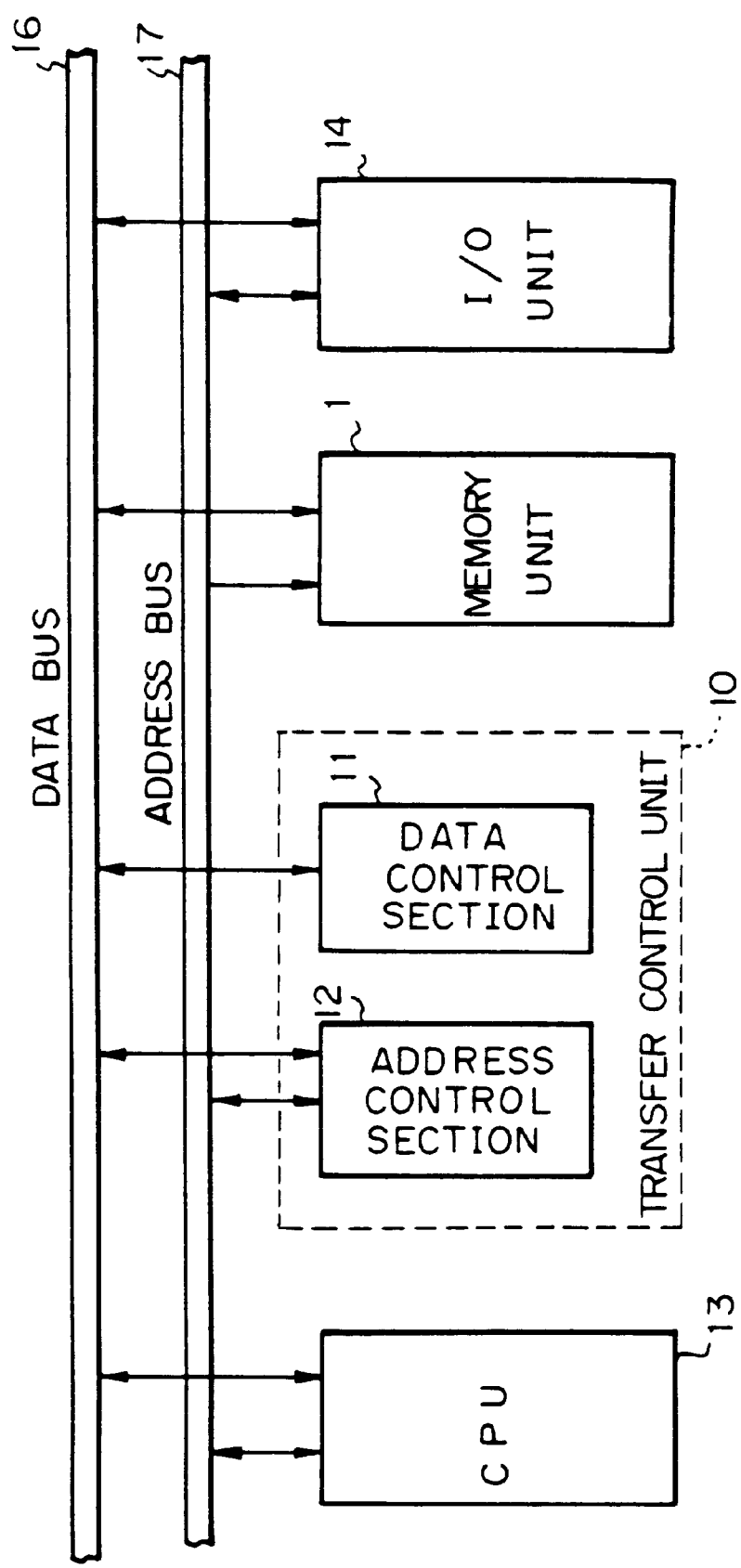
FIG. 2 is a block diagram of an information processing apparatus capable of transferring data.
Figure 7:
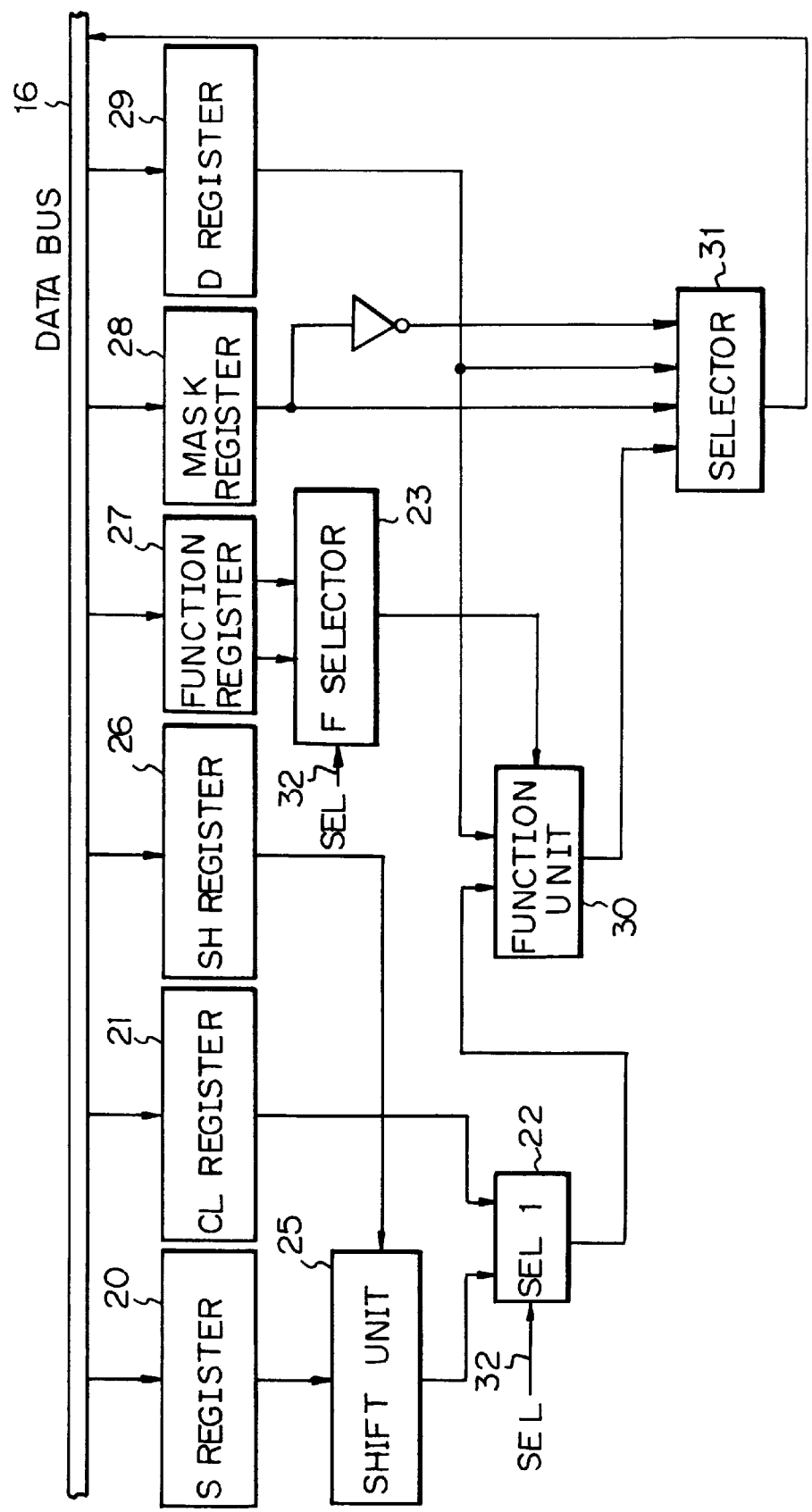
FIG. 7 is a block diagram of the data control section in the data transfer control of an apparatus according to an embodiment of the present invention, FIG. 8 composed of FIGS. 8A and 8B is a flow chart of the data transfer control of the apparatus according to the present embodiment.

FIG. 7 shows the details of the data control section 11 of the transfer control unit 10 according to an embodiment of the present invention shown in FIG. 2. In FIG. 7, portions similar to those of FIG. 3 are given similar reference numerals.

Figure 3:
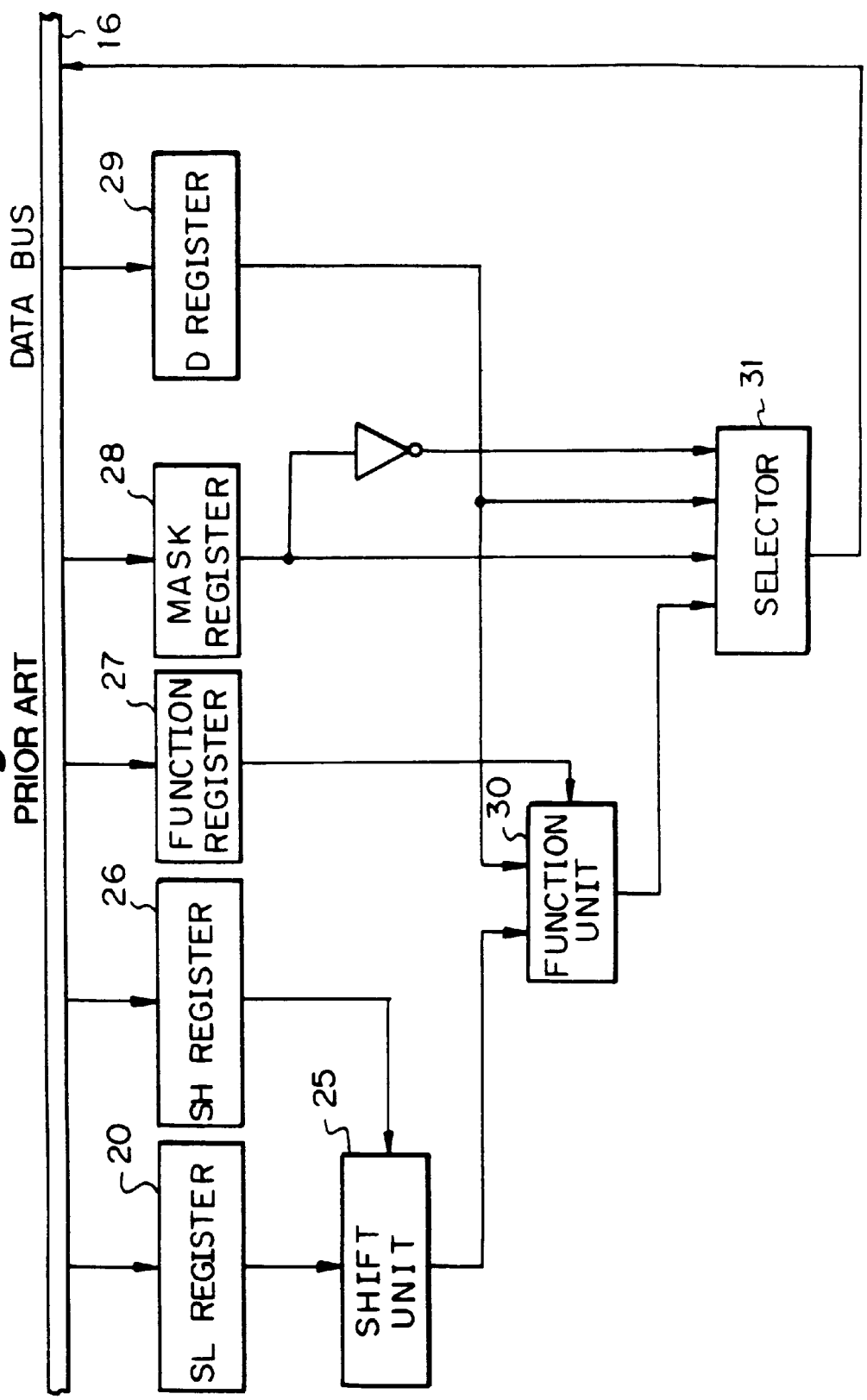
FIG. 3 is a block diagram of the data control section in the data transfer control according to the prior art.

In the present embodiment, in addition to the registers shown in FIG. 3, a C register designated by 21 is provided and arbitrary data is set therein. SEL1 (22) which is a selector for changing over the output data from shift unit 25 and the output data from the C register 21 by SEL signal 32 and outputting the same is added between the shift unit 25 and the function unit 30, and F selector 23 controlled by SEL signal 32 and selectively outputting the logical operation indicating command and the logical operation inhibiting command of function unit 30 from function register 27 is added between function register 27 and function unit 30.

This effects control so that the content of the [S address counter] address of a rectangular area 2 is read out and operated by the shift logic, whereafter it is mask-processed and stored in the [D address counter] address of a rectangular area 3, whereafter SEL signal is turned off and the content of C register 21 is stored, in the [S address counter] address only by mask processing, whereby the data of C register 21 is written in the rectangular area 2 after transfer of the data.

Figure 4:
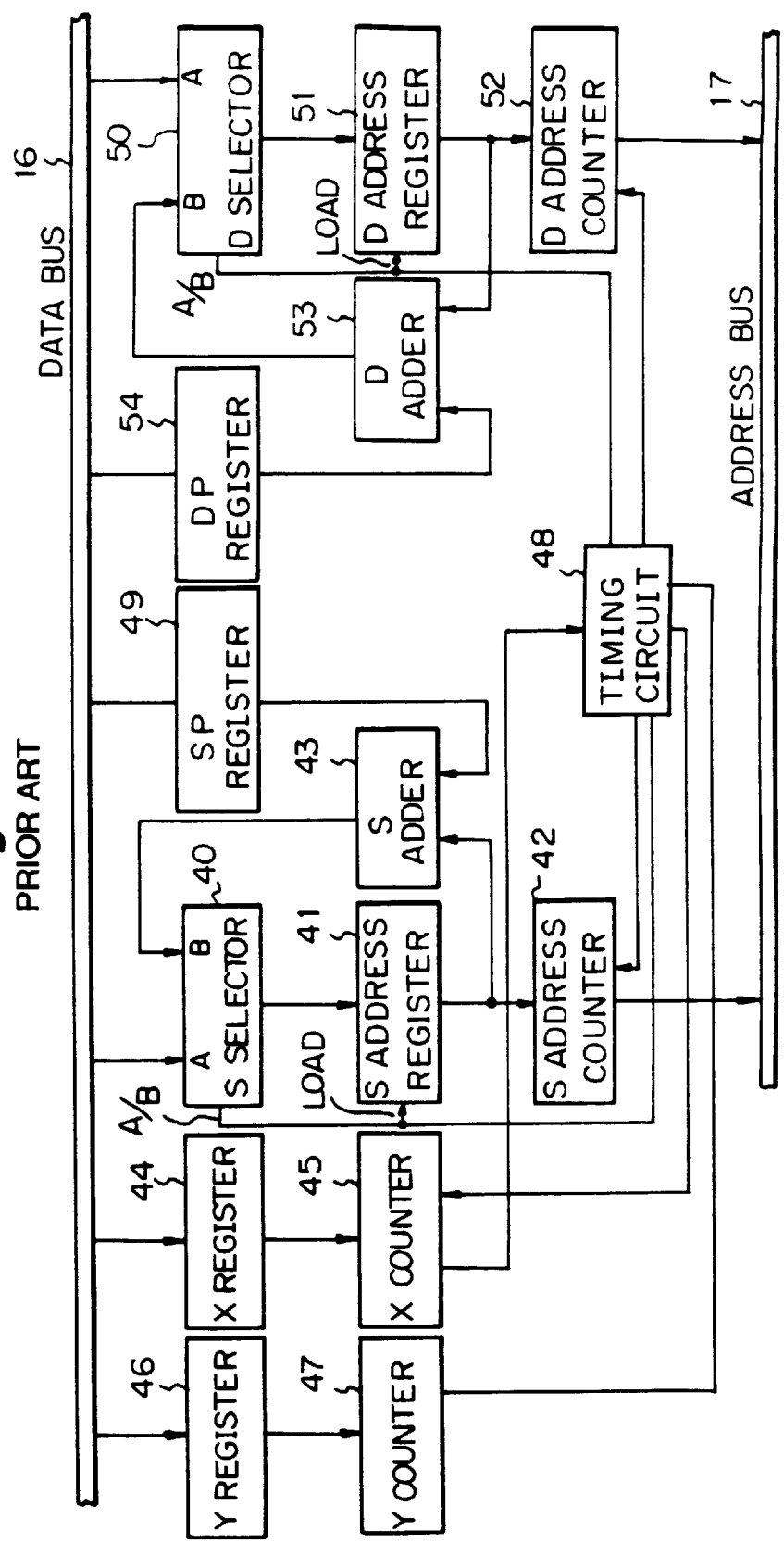
FIG. 4 is a block diagram of the address control section in the data transfer control unit.

The construction of the address control section 12 is similar to the construction of that of FIG. 4.

Figure 8B:
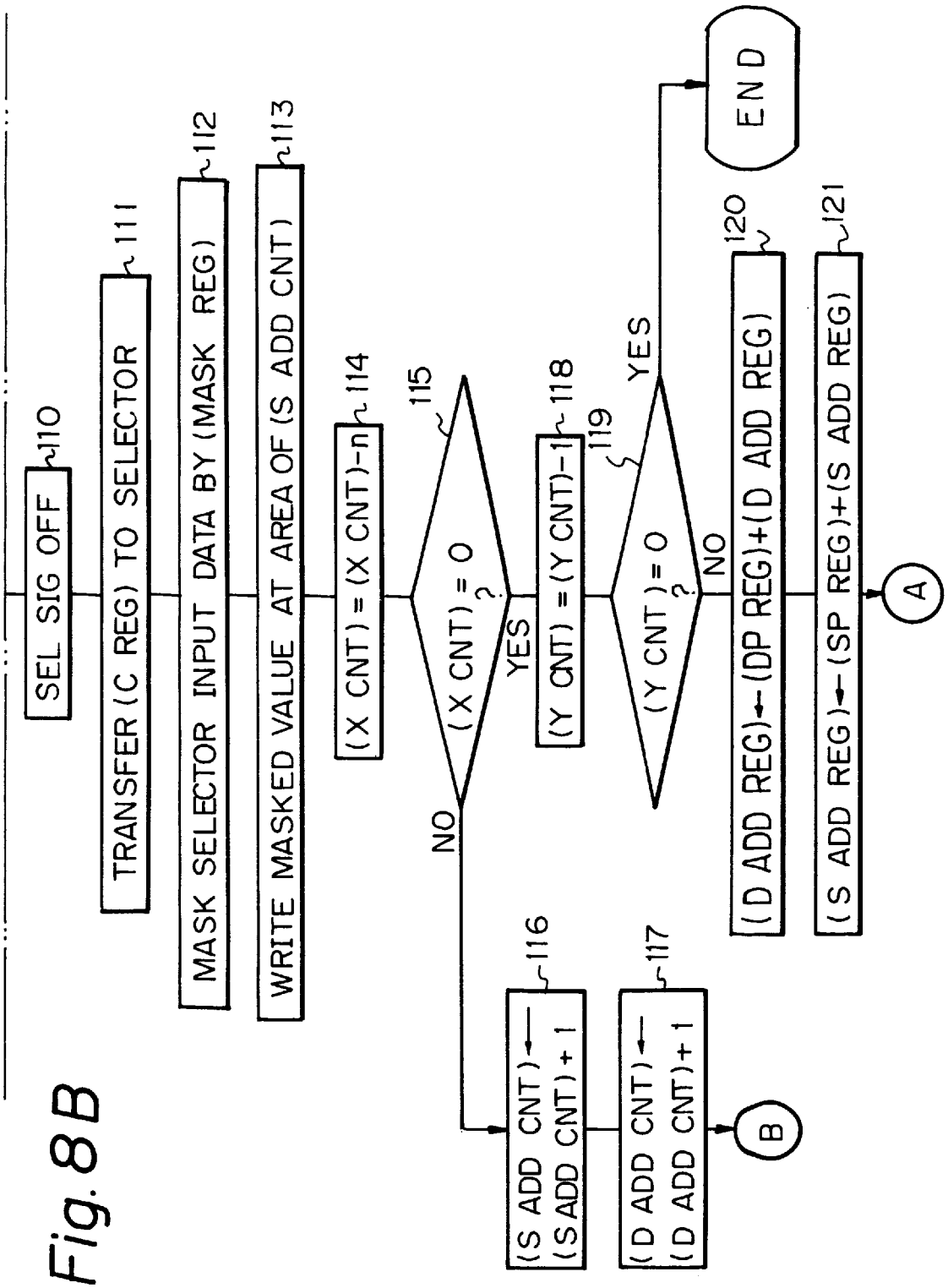

The data transfer process of the apparatus of the present embodiment will hereinafter be described, in detail, by reference to the flow chart of FIG. 8.

First, at step 101, a fixed value is set at each register. This sets "SADD" at S address register 41 through S selector 40, "DADD" at D address register 51 through D selector 50, the lateral length "X" of the rectangular area transferred to X register 44, the vertical length "Y" of the rectangular area transferred to Y register 46, the shift number in the shift unit 25 at SH register 26, the designation command of logical operation in the function unit 30 at the function register 27, the mask data in the selector 31 at the mask register 28, and the number corresponding to the lateral length of the memory area of the memory unit 1 at SP register 49 and DP register 54, and further sets at C register 21 the data to be written into the rectangular area 2 after the transfer of the data.

Subsequently, at step 102, the value of Y register 46 is set at Y counter 47, and at step 103, the value of the remaining S address register 41 is set at S address counter 42, the value of D address register 51 is set at D address counter 52 and the value of X register 44 is set at X counter 45. At step 104, the content of (S address counter) address of the rectangular area 2 of the memory unit 1 is read out and set at S register 20. At the same time, SEL signal 32 is turned on so that data is output from the shift unit 25 to the function unit 30 through SEL1 (22).

Thereafter, at step 105, the data from S register 20 is shifted at shift unit 25 by the designated number in SH register 26. This shifted output data from shift unit 25 is input to SEL1 (22), but since SEL signal 32 is turned on, the data from shift unit 25 is selectively put out from SEL1 (22). SEL signal 32 is also input to F selector 23 and logical operation command from the function register 27 is input to function unit 30. Subsequently, at step 106, the content of the rectangular area 3 of the memory unit 1 designated at the (D address counter) address is read to D register 29. At step 107, the data from shift unit 25 sent to function unit 30 through SELL (22) and the read-out data of D register 29 are logically operated at the function unit 30 in accordance with the designation of function register 27 sent through F selector 23. The result of this operation and the value of D register 29 are input to selector 31. At the same time, the mask data set at mask register 28 is also input to selector 31 and at step 108, the input data to selector 31 is subjected to masking in accordance with the mask data, and the data subjected to masking is put out to the data bus 16. This masking data is in the form of the data to be transferred to the rectangular area 3 and at step 109, this value is written into the address indicated by D address counter 52. At step 110, SEL signal 32 is turned off.

Thus, the value of C register 21 is selected and output from SEL1 (22) and the logical operation inhibiting command from function register 27 is selected and output from F selector 23. Therefore, as shown at step 111, the value of C register 21 is input to the function unit 30 through SEL1 (22) and is intactly put out therefrom without being logically operated in function unit 30, and the value of the C register is intactly input to selector 31.

At step 112, as at step 108, the input data is subjected to masking in accordance with the mask data of the mask register 28 and is output to data bus 16. At step 113, this data is written into the address indicated by S address counter 42. At step 114, the value of X counter 45 is counted down by the transfer termination bit number n.

When the above-described processing is terminated, the transfer of n bits of data to the rectangular area 3 is terminated and the value of the C register is written into the rectangular area 2 and at step 115, transfer of one line of data is terminated and whether X counter 45 has become "0" is determined. If X counter 45 is "0", the program proceeds to step 118 which will later be described, and if X counter 45 is not "0", S address counter 42 is counted up by one at step 116 and subsequently, at step 117, D address counter 52 is counted up by one and the program returns to step 104.

When, at step 115, the value of X counter 45 is judged as "0" and transfer of the data corresponding to the lateral length (X) is terminated, the program proceeds to step 118 and Y counter 47 is counted down by one. At step 119, whether Y counter 47 is "0" is examined. When Y counter 47 is "0", transfer of all data is terminated and the data transfer process is terminated.

When the data transfer is not yet terminated, Y counter 47 assumes a positive value and the program proceeds to step 120, and the values of D address register 51 and DP register 54 are added together in D adder 53 and again set at D address register 51. Thereby, the first address of the next line of the rectangular area 3 is set at D address register 51. The program then proceeds to step 121 and as at step 120, the values of SP register 49 and S address register 41 are added together in S adder 43 and the first address of the rectangular area 2 is set at S address register 41. Then, the program returns to step 103 and data transfer is continued.

As described above, in the present embodiment, by setting arbitrary data at C register 21, the data of this C register can be stored in the memory area of the transfer origin and at the same time, data transfer can also be effected and therefore, data transfer and clearing of the memory area of the transfer origin can be accomplished by only setting a "blank" code at C register 21, for example, when the present embodiment is used for the display memory of a display device, and by only setting "0" code when the present embodiment is used for a numerical data storing memory.

Also, by making C register 21 into a buffer structure capable of storing a plurality of data therein, the particular pattern over the whole of the rectangular area 2 can be designated and stored.

According to the present invention, as described above, there can be provided a data transfer system whereby the stored information in a particular area of memory means is transferred to another memory area and a particular area of the transfer origin is rewritten by arbitrary information, and the processing heretofore divided into two steps and executed individually can be executed by a single operation and moreover by using an address in common, and this leads to the possibility of reducing processing time and simplifying control.

A second embodiment of the present invention will now be described by reference to the drawings.

Figure 9:
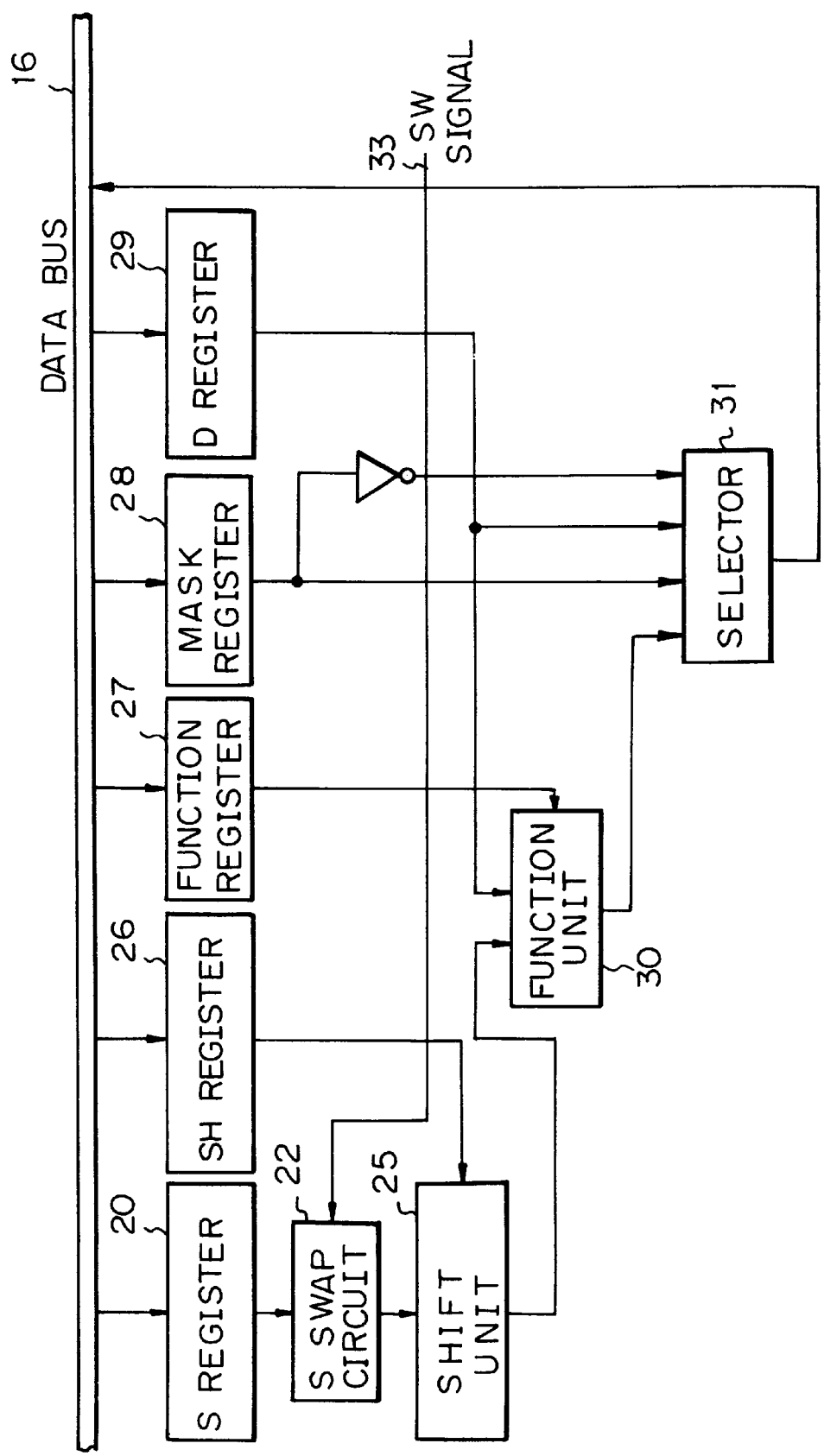
FIG. 9 is a block diagram of the data control section in the data transfer control of an apparatus according to an embodiment of the present invention, FIG. 10 composed of FIGS. 10A and 10B is a block diagram of the address control section of the data transfer control unit of the apparatus according to the present embodiment.

FIG. 9 shows the details of the data control section of the transfer control unit 10 according to an embodiment of the present invention shown in FIG. 2. In FIG. 9, portions similar to those of FIG. 3 are given similar reference numerals. In the present embodiment, S swap circuit 22 for directly the data from S register 20 to the shift unit 25 when SW signal 33 is turned off, and changing the output data from S register 20 in units of one byte and swapping it when SW signal 33 is turned on, is provided between S register 20 and the shift unit 25 shown in FIG. 3. In the apparatus of the present embodiment, processing is effected in the unit of 16 bits (i.e., two bytes), while the memory unit 1 effects processing in units of one byte and therefore, when the address counter is in the count-up mode, the read-out data is stored, for example, in S register 20, such as that shown in FIG. 11A. The data of position n of the memory unit is set at the less significant byte and the data of position n+1 is set at the more significant byte. In contrast, when the address counter is in the count-down mode, as shown at 90 in FIG. 11B, the data of position n−1 of the memory unit is set at the least significant byte, and the data of position n of the memory unit is set at the more significant byte, and this is for the purpose of providing an arrangement similar to that during the count-up, as shown at 91 in FIG. 11B.

Figure 10B:
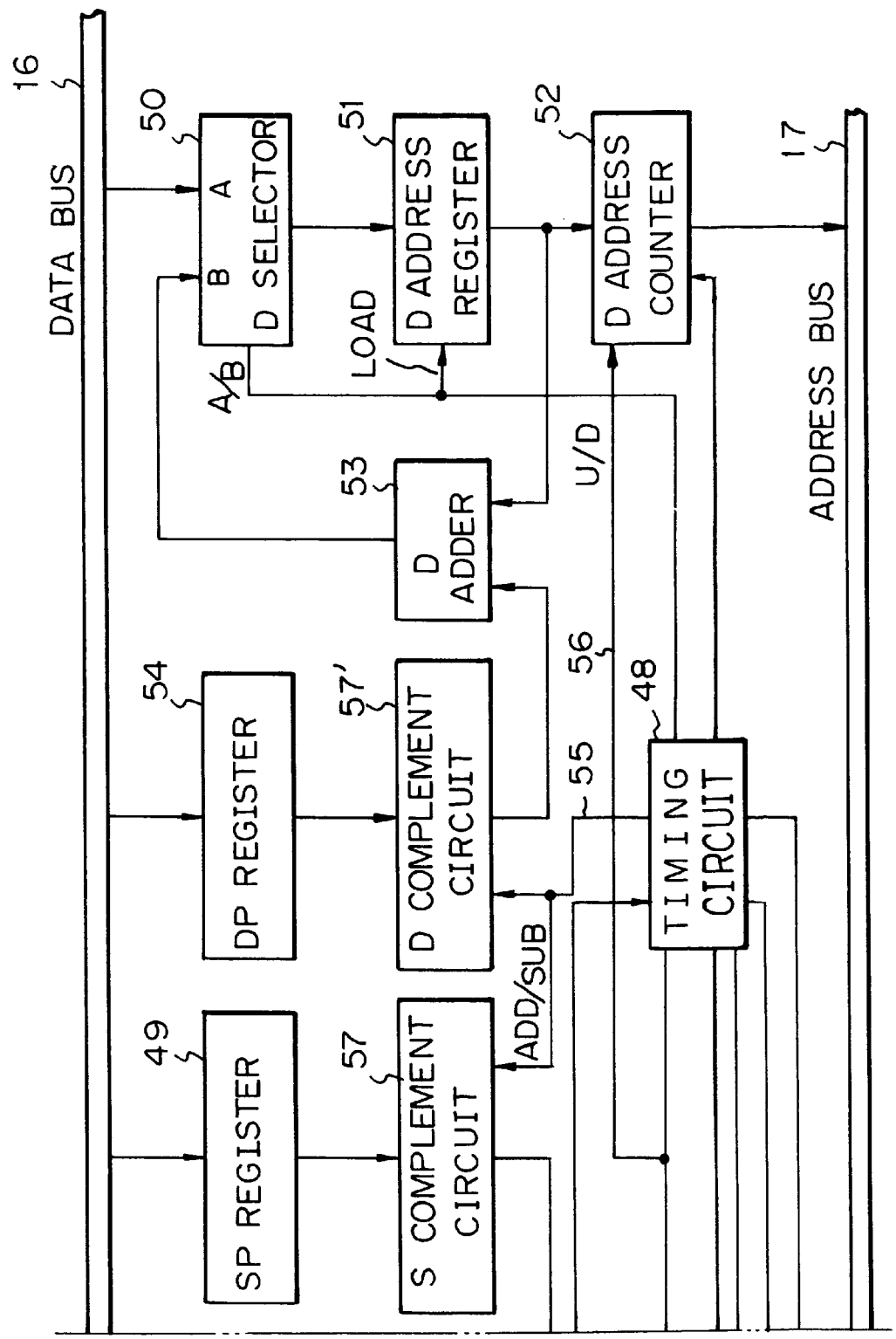

A block diagram of the present embodiment of the address control section 12 shown in FIG. 2 is shown in FIG. 10. In FIG. 10, portions similar to those of FIG. 4 are given similar reference numerals.

In FIG. 10, S complement circuit 57 is inserted between SP register 49 and S adder 43, and D complement circuit 57' is inserted between DP register 54 and D adder 53. The S complement circuit 57 and D complement circuit 57' are controlled by ADD/SUB signal 55 and, when ADD/SUB signal 55 is turned on, these complement circuits complement-convert {−(SP register) or −(DP register)} the values of SP register 49 and DP register 54 and supply them to S adder 43 and D adder 53, respectively. In this case, the adders subtract the values of SP register 49 and DP register 54 from the value of the address register. When ADD/SUB signal 55 is turned off, the complement circuits do not complement the values of SP register 49 and DP register 54 but directly output them. Also, unlike the arrangement of FIG. 4, the aforementioned SW signal 33 and ADD/SUB signal 55 are output from a timing circuit 48. The timing circuit 48 also outputs to S address counter 42 and D address counter 52 U/D signal 56 representative of whether count-up or count-down is to be effected.

Figure 6:
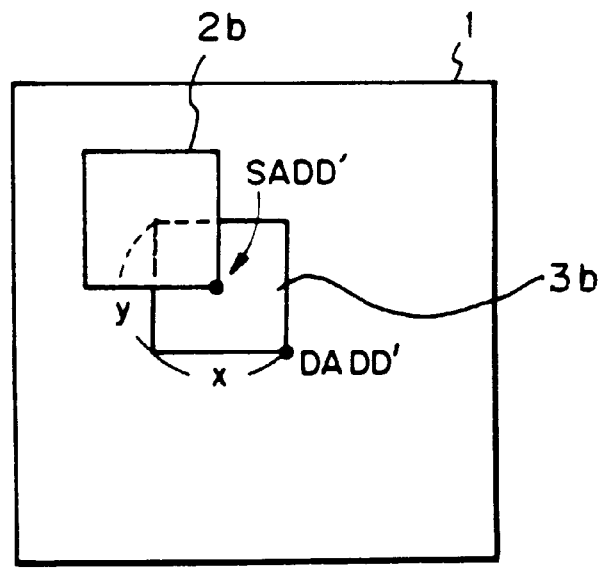

In the prior art, addresses have been successively added from the left upper position SADD of the rectangular area 2, and the first line has been transferred to the rectangular area 3 and when the transfer of one line has been terminated, the values of SP register 49 and DP register 54 have been added to the first address of the first line to effect the transfer of the second line and the first address of the second line has been found and transfer has been effected successively, whereas in the apparatus of the present embodiment, SW signal 33 is turned off from the timing circuit 48, U/D signal 56 is set at U, ADD/SUB signal 55 in the count-up mode is set at ADD and the outputs of S complement circuit 57 and D complement circuit 57' are controlled so as to be the values of SP register 49 and DP register 54, whereby processing entirely similar to that of the apparatus according to the prior art can be effected. Further, SW signal 33 is turned on from the timing circuit 48, ADD/SUB signal 55 is set at SUB, the outputs from S complement circuit 57 and D complement circuit 57' are set at the complement values {−(SP register) or −(DP register)} of SP register 49 and DP register 54, U/D signal 56 is set at D, and the mode is made into the count-down mode, whereby as shown in FIG. 6, the rectangular area 2b can be transferred in succession from the right lower position SADD' of the rectangular area 2b and from the right lower position DADD' of the rectangular area 3b.

Figures 12, 12A:
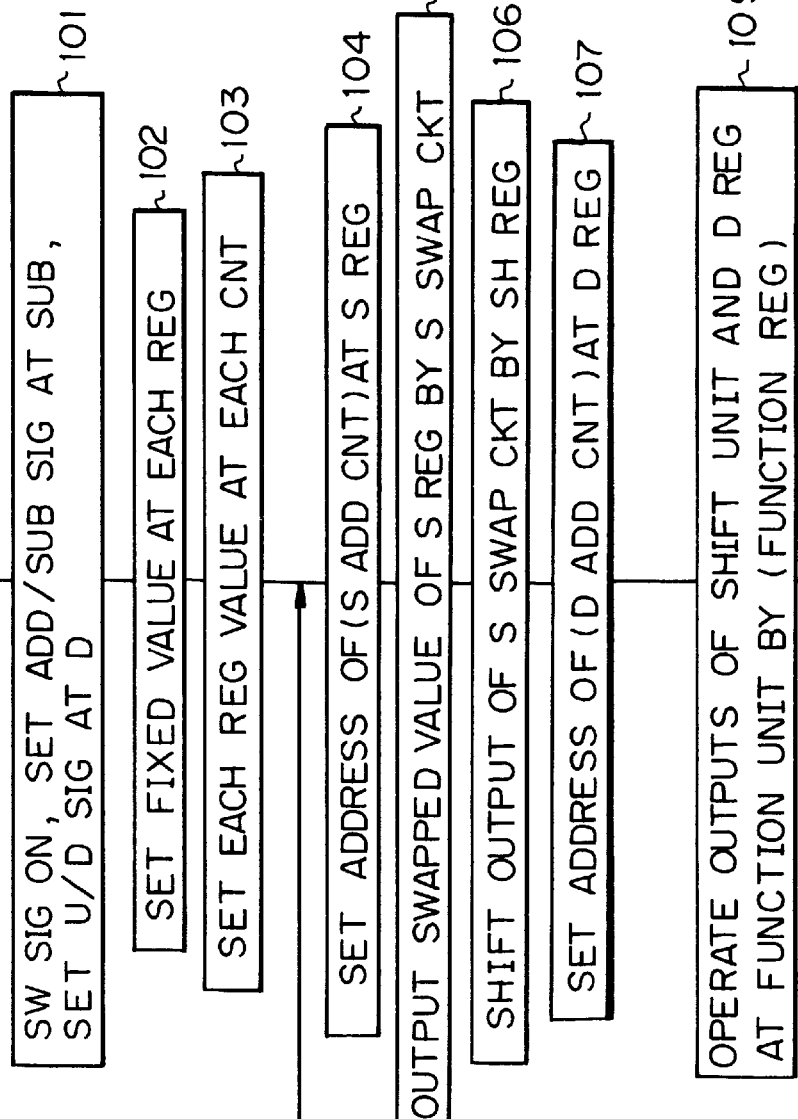
Figure 12B:
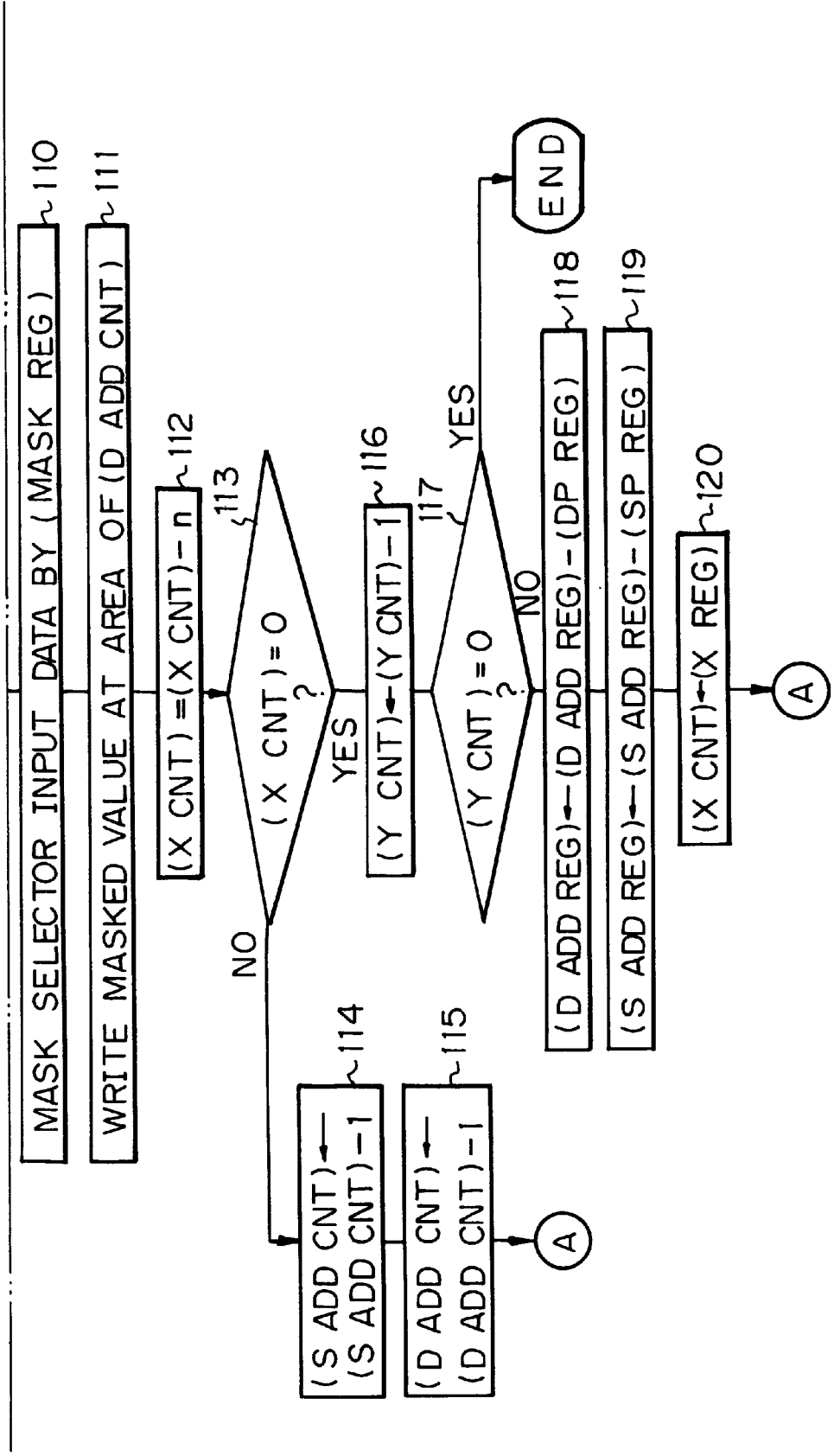

The control operation of the apparatus of the present embodiment in a case where the rectangular area 2b from SADD' is transferred to the rectangular area 3b from DADD' will hereinafter be described in detail by reference to the flow chart of FIG. 12.

First, at step 101, as previously described, SW signal 33 is turned on, ADD/SUB signal 55 is set at SUB and U/D signal 56 is set at D, and subsequently at step 102, a fixed value is set at each register. This sets "SADD'" at S address register 41 through S selector 40, "DADD'" at D address register 51 through D selector 50, the lateral length x of the rectangular area transferred to X register 44, the vertical length y of of the rectangular area transferred to Y register 46, the shift number in the shift unit 25 at SH register 26, the designation command of logical operation in the function unit 30 at the function register 27, the mask data in the selector 31 at the mask register 28, and the number corresponding to the lateral length of the memory area of the memory unit 1 at SP register 49 and DP register 54. At step 103, the value of each register is set at each counter. This sets the value of Y register 46 at Y counter 47, and sets the value of X register 44 at X counter 45, the value of S address register 41 at S address counter 42, and the value of D address register 51 at D address counter 52. At step 104, the content of (S address counter) address of the rectangular area 2b of the memory unit 1 is read out and set at S register 20.

Figures 11A, 11B, 15A, 15B, 15C:
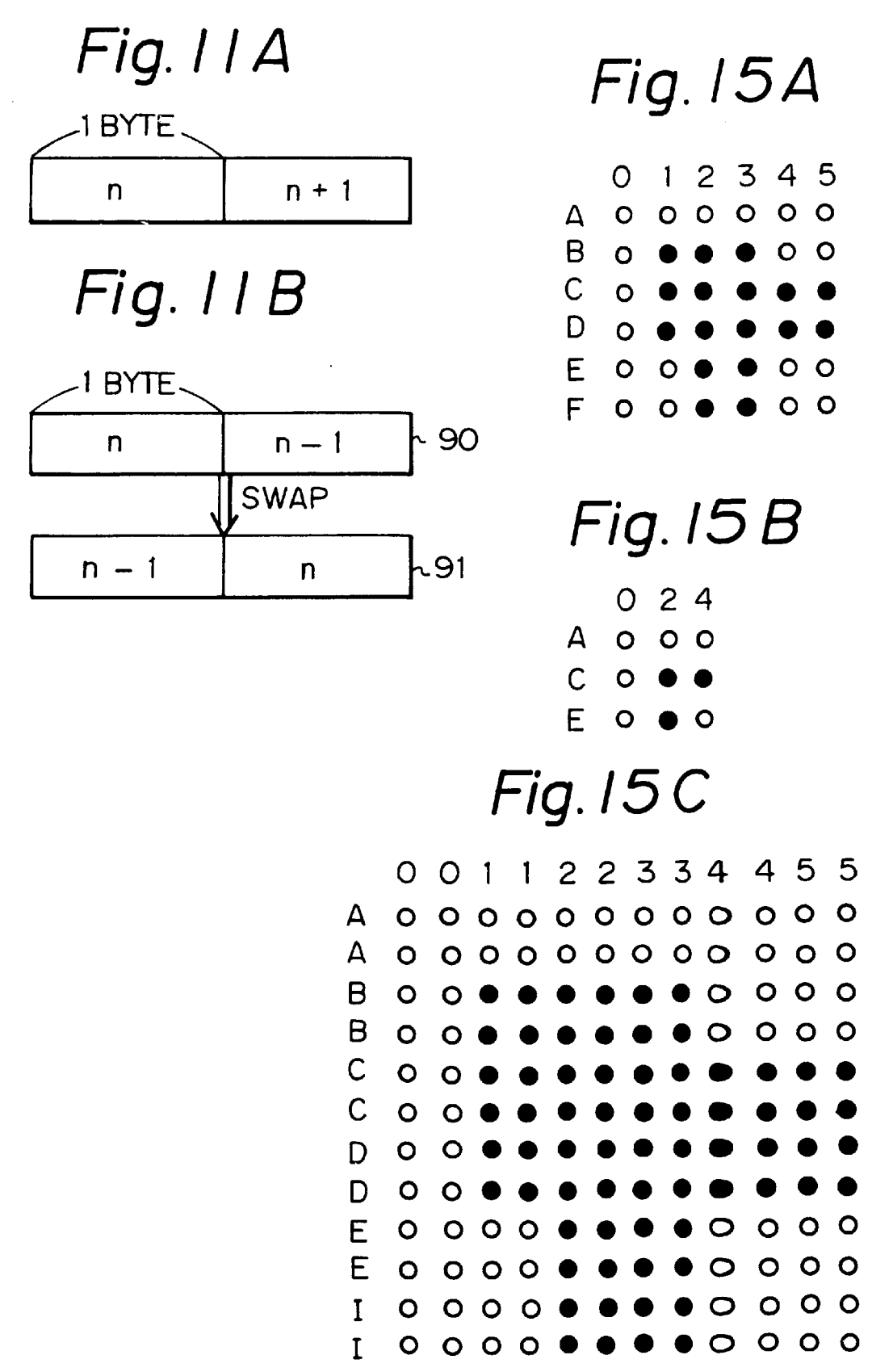

When the read-out data is set at S register 20, S swap circuit 22 swaps the output data of S register 20 in byte unit[]at step 105 as shown in FIG. 11B, and at step 106, the data from S swap circuit 22 is shifted in shift unit 25 by a number designated by SH register 26. At step 107, the content of the rectangular area 3b of the memory unit 1 designated by (D address counter 52) address is read out at D register 29. Subsequently, at step 109, the output data from D register 29 and the output data from the shift unit 25 shifted at step 106 are logically operated in the function unit 30 in accordance with the designation of function register 27. The result of this operation and the value of D register 29 are input to selector 31. At the same time, the mask data set by the mask register 28 is also input to the selector 31 and at step 110, the input data to the selector 31 is masked in accordance with this mask data and the thus masked data is output to the data bus 16. This masking data is in the form of a data to be transferred to the rectangular area 3b, and at step 111, this value is written into the address shown by D address counter 52. At step 112, the value of X counter 45 is counted down by the transfer termination bit number n.

Thus, the transfer of n bits of data to the rectangular area 3 has been terminated and at step 113, the transfer of one line of data is terminated, and whether X counter 45 has become "0" is determined.

If X counter 45 is "0", the program proceeds to step 116 which will later be described, and if X counter 45 is not "0", the program proceeds to step 114 and S address counter 42 is counted down by one and subsequently, at step 115, D address counter 52 is counted down by one and the program returns to step 104.

When at step 113 the value of X counter is determined to be "0" and the transfer of the data corresponding to the lateral length (X) is terminated, the program proceeds to step 116 and the counter 47 is caused to count down by one. At step 117, whether Y counter 47 is "0" is examined. If Y counter 47 is "0", the transfer of all data is terminated and the data transfer process is terminated.

When the data transfer has not yet been terminated, Y counter 47 assumes a positive value and 15 the program proceeds to step 118, and the complement value of D address register 51 and DP register 54, that is, the value of D complement circuit 57' from which {−(DP register)} is output, is added in D adder 53 and is again set at D address register 51. Thereby, the value of {(D address register)−(DP register)} is set at D address register 51 and the first address of the line preceding the rectangular area 3b is set. Subsequently, at step 119, the value of S address register 41 and the value of S complement 25 circuit 57 are likewise added together in S adder 43 and are again set at S address register 41, and the top first address of the line preceding the rectangular area 2b is set. Thereafter the program proceeds to step 120 and the value of X register 44 is set at X counter 45 and the preparation for the transfer of the data of the preceding line is made, and then the program returns to step 104 and the transfer of data is executed until Y counter 47 becomes "0".

By transferring the data as described above, the transfer of the data can be properly accomplished even in the case as shown in FIG. 6, where the transfer areas occupy a common portion of memory.

Also, in the circuit of the present embodiment, the states in which the read-out data are stored in the register differ from each other and therefore the data are swapped in units of one byte, but the swap circuit may be made integral with the shift unit so that swap and shift can be effected at one time.

Also, the circuit of the present embodiment has been described with respect to an example in which data transfer begins at the right lower position, but S address counter 42 and D address counter 52 are brought into the count-up mode so that the value of SP register 49 is subtracted and stored in S address counter 42 and the value of DP register 54 is subtracted and stored in D address counter 52 and in order that the first address of the preceding line may be found as the top address of each line, SW signal 55 is set at SUB and U/D signal 56 is set to the U mode, whereby data transfer can begins at the left lower position.

Likewise, by turning on SW signal, setting ADD/SUB signal 55 at ADD and setting U/D signal to the D mode, S address counter 42 and D address counter 52 are set to the count-down mode so that the value of SP register 49 is added to S address counter 42 and the value of DP register 54 is added to D address counter 52, and by turning on the swap circuit, it is of course possible to begin data transfer from the right upper position.

According to the present invention, as described above, there can be provided a data transfer system whereby data transfer becomes possible without loss of the memory content by selecting the transfer starting position even in a case where the memory areas of the data transfer origin and the data transferee have common portions due to the addition of a simple construction.

A third embodiment of the present invention will hereinafter be described by reference to the drawings.

Figure 13:
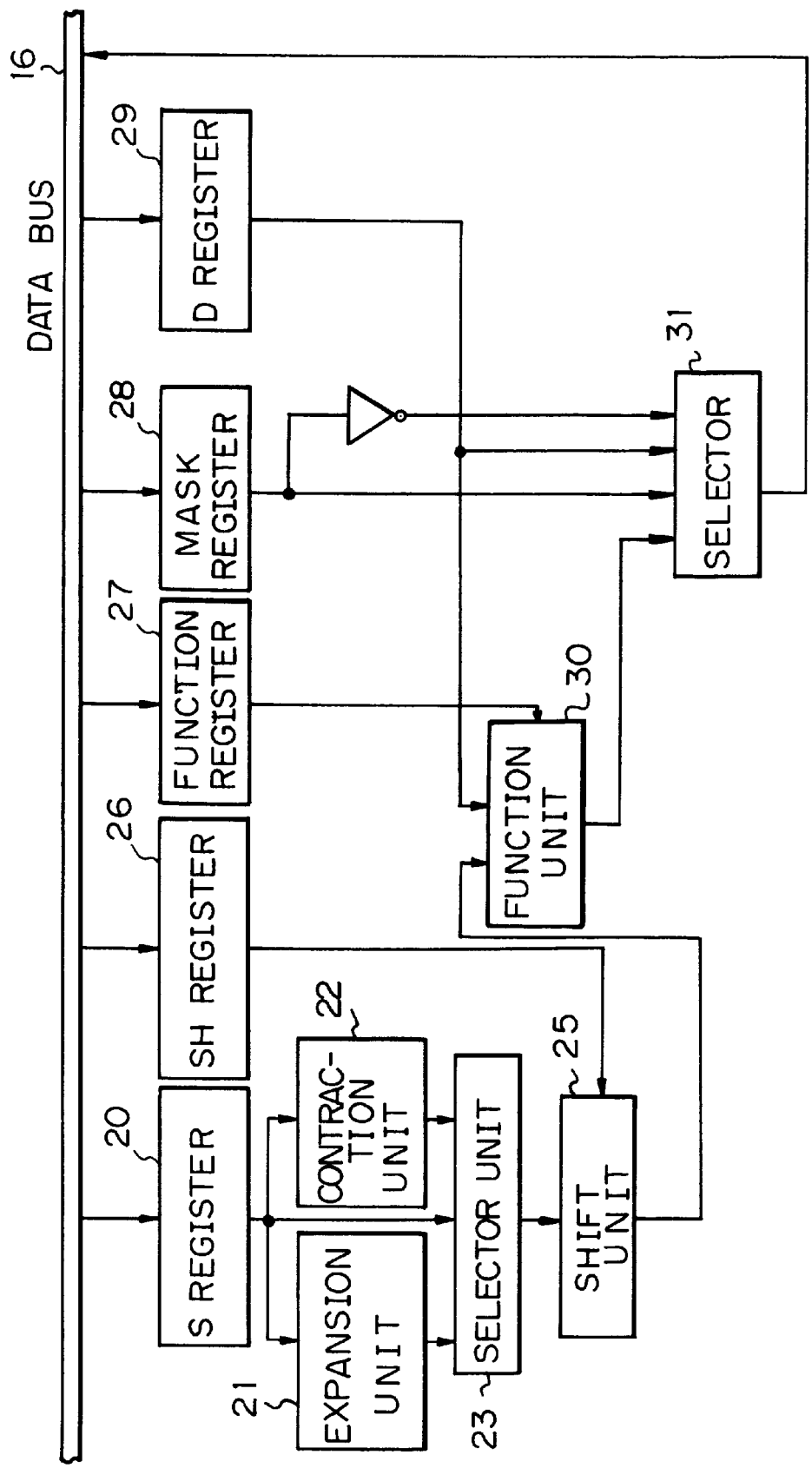
FIG. 13 is a block diagram of the data control section in the data transfer control of an apparatus according to an embodiment of the present invention.

FIG. 13 shows the details of the data control section 11 of the transfer control unit 10 according to an embodiment of the present invention shown in FIG. 2. In FIG. 13, portions similar to those of FIG. 3 are given similar reference numerals.

In the present embodiment, an expansion unit 21 for expanding the output data from the S register, a contraction unit 22 for contracting the output data and a selector unit 23 are provided between S register 20 and shift unit 25 shown in FIG. 3, and the outputs of expansion unit 21 and contraction unit 22 are input to selector unit 23 and the output of selector unit 23 is input to shift unit 25 similar to that shown in FIG. 3.

The construction of address control section 12 is similar to that shown in FIG. 4, but the count output timing of each counter from the timing circuit 48 differs during expansion and contraction.

Figure 1:
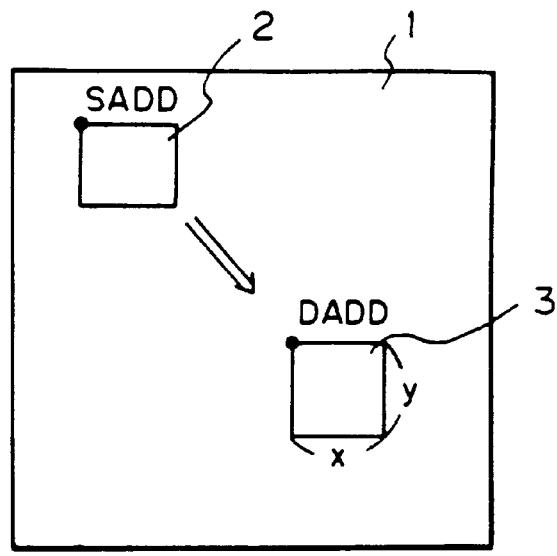
FIG. 1 schematically shows the transfer area of the data of a memory unit.
Figure 5:
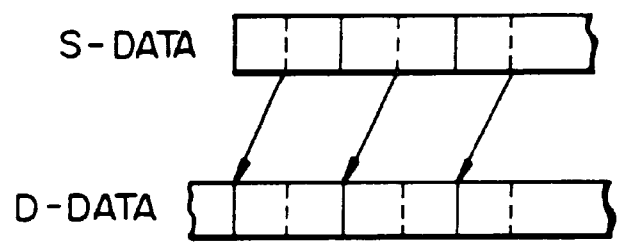
FIG. 5 shows an example of the modification of the difference between the bit positions of data transfer, FIG. 6 schematically shows a case where the data transfer areas have a portion of memory in common.

The present embodiment will be described with respect to an example in which during data transfer, as the expansion process, the data from the rectangular area 2 shown in FIG. 1 is expanded to (2×2) times and as the contraction process, said data is contracted to (½×½).

The expansion process is effected with the same bit is repeated twice and the contraction process is effected such that both of the horizontal bit and the vertical bit being eliminated. An example of the expansion and of the contraction is shown in FIG. 15.

The S-DATA from the rectangular area 2 shown in FIG. 15A is changed as shown in FIG. 15B during contraction, and changed as shown in FIG. 15C during expansion, whereby the data transfer to the rectangular area 3 is effected.

Figure 14:
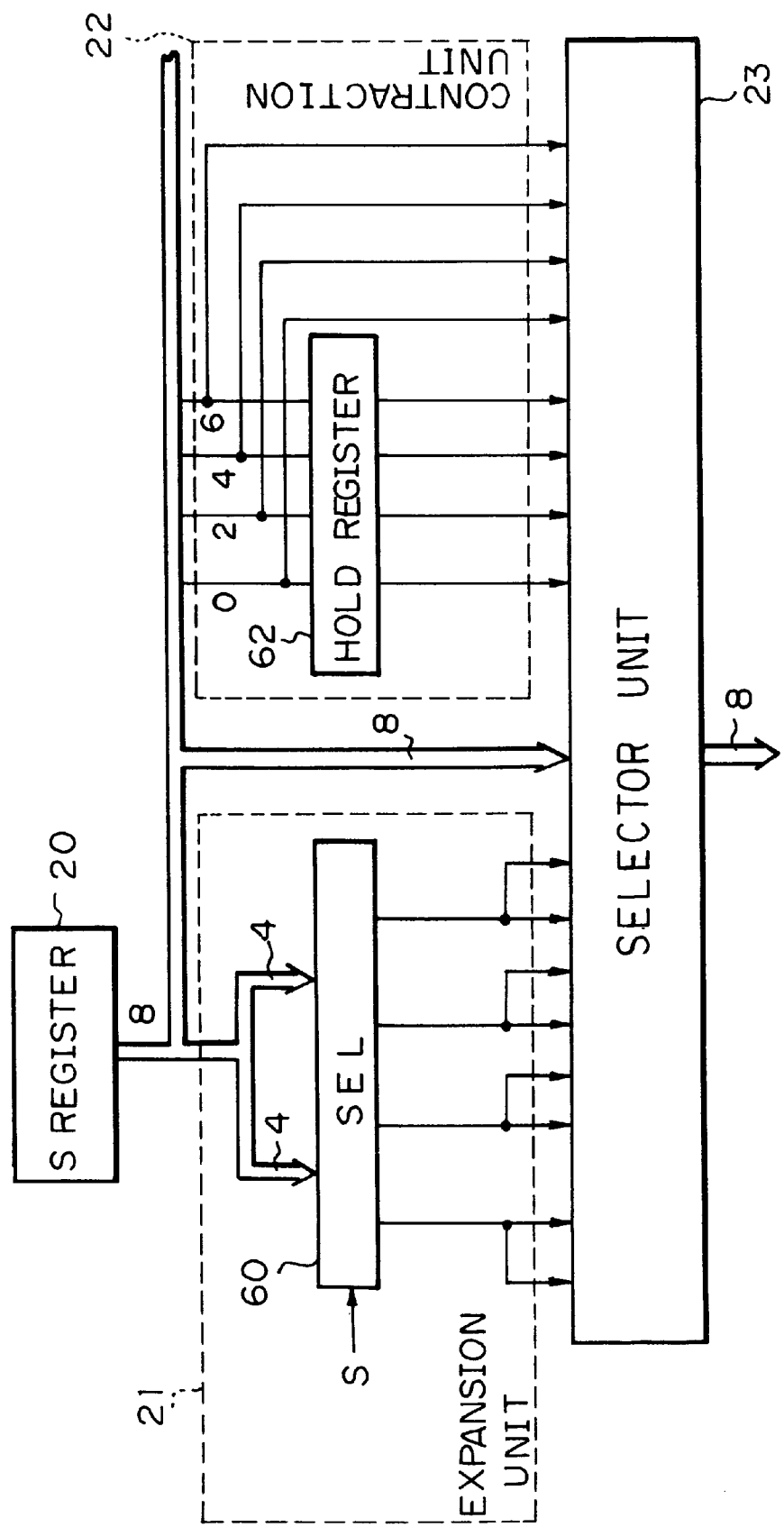
FIG. 14 shows the details of the expansion unit and contraction unit of the data control section of the apparatus according to the present embodiment.

A detailed block diagram of expansion unit 21 and contraction unit 22 which effect the expansion and contraction, respectively, is shown in FIG. 14.

During expansion, the value of S register 20 (here the bit width is prescribed as 8 bits) is divided into the most significant 4 bits and the least significant 4 bits, and these bits are selectively output by SEL 60, and this 4-bit output is produced into 8 bits and output, and two cycles of writing into the rectangular area 3 is effected by one readout data of S register 20, and the count-up of S address counter 42 is effected at a rate of one half of the count-up rate of D address counter 52.

During contraction, four of the even number bits of S-DATA from S register 20 are first held in a hold register 62. The even number bits of S-DATA subsequently read out are added thereto to provide 8 bits, which are written into the rectangular area 3. In the vertical direction, read-out of S-DATA is effected every other line.

The details of the expansion and contraction processes will hereinafter be described by reference to the expansion process flow chart of FIG. 16 and the contraction process flow chart of FIG. 17.

Figures 2, 16A:
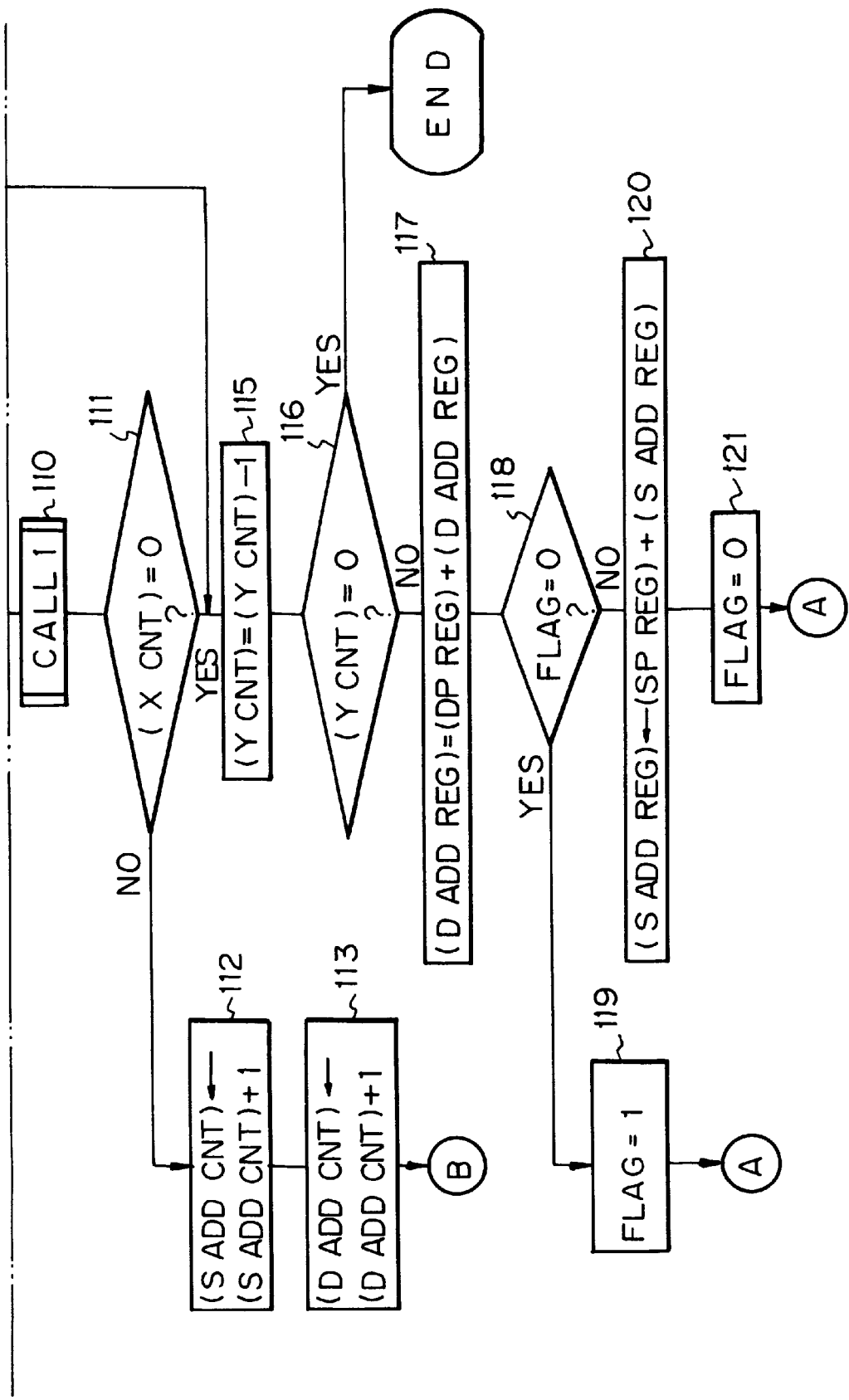
Figure 17B:
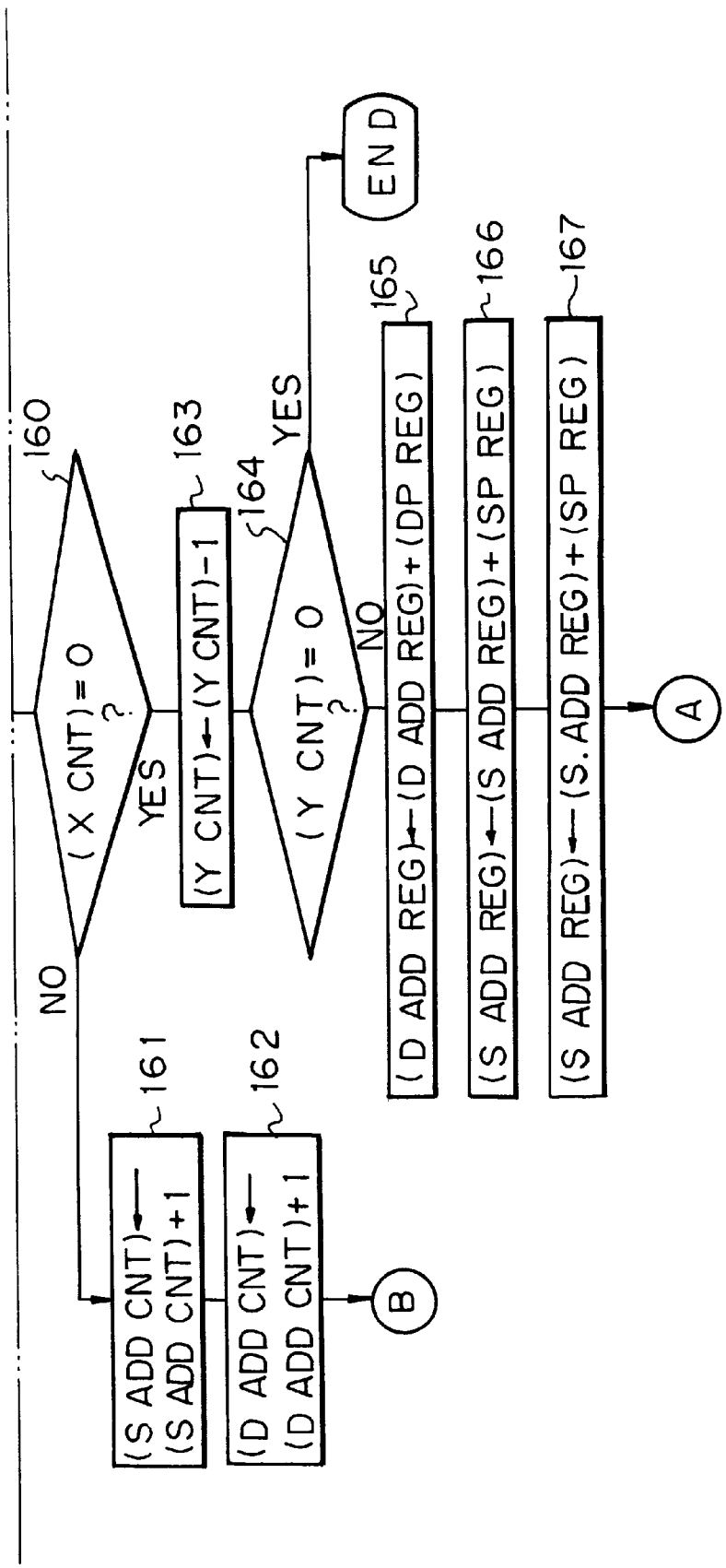

To effect data transfer while effecting the expansion process, as shown in FIG. 16A, at step 101, expansion unit 21 is first selected, and instructions are given so that the output of selector unit 23 is made into the output from expansion unit 21, and a flag is set to "0". At step 102, a fixed value is set at each register. This sets "SADD" at S address register 41 through S selector 40, "DADD" at D address register 51 through D selector 50, the lateral length "X" of the rectangular area transferred to X register 44, the vertical length "Y" of the rectangular area transferred to Y register 46, the shift number in the shift unit 25 at SH register 26, the logical operation designation command in function unit 30 at function register 27, the mask data in selector 31 at the mask register 28, and the number corresponding to the lateral length of the memory area of memory unit 1 at SP register 49 and DP register 54.

Subsequently, at step 103, the value of Y register 46 is set at Y counter 47, and at step 104, the remaining value of S address register 41 is set at S address counter 42, the value of D address register 51 is set at D address counter 52 and the value of X register 44 is set at X counter 45. At step 105, the contents of (S address counter) address of the rectangular area 2 of the memory unit 1 is read out and set at S register 20. Here, the input signal S to the SEL 60 of expansion unit 21 is set at "0", and control is effected so that the data of the most significant 4 bits of the 8-bit data set at S register 20 is first put out from SEL 60 and produced into 8 bits and output from selector unit 23. Then the subroutine CALL 1 of step 200 is called.

Figure 16B:
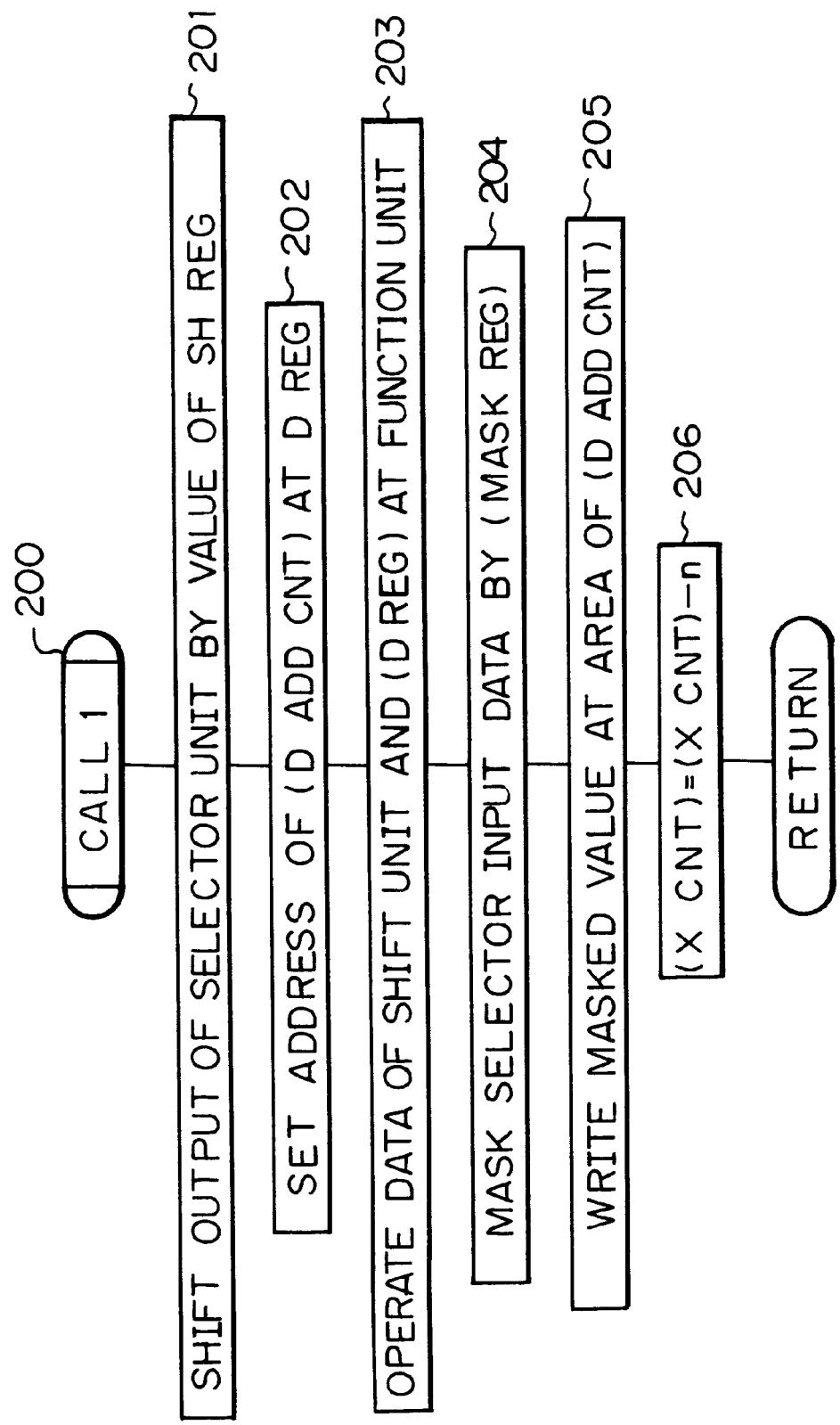

The flow of the subroutine CALL 1 is shown in FIG. 16B.

First, at step 201, the data from the selector unit 23 is shifted in the shift unit 25 by the designated number at SH register 26. At step 202, the content of the rectangular area 3 of the memory unit 1 designated by (D address counter) address is read out at D register 29. Subsequently, at step 203, the shifted data in shift unit 25 and the read-out data of D register 29 are logically operated in function unit 30 in accordance with the designation of function register 27. The result of this operation and the value of D register 29 are input to selector 31. At the same time, the mask data set at mask register 28 is also input to selector 31 and, at step 204, the input data to the selector 31 is masked in accordance with this mask data and the masked data is output to the data bus 16. This masking data is in the form of the data to be transferred to the rectangular area 3, and at step 205, this value is written into the address shown by D address counter 52. At step 206, the value of X counter 45 is counted down by the transfer termination bit number n. Then, the program returns to terminate the process of the subroutine CALL 1.

When the process of the subroutine CALL 1 of step 200 is terminated, the transfer of n-bit data to the rectangular area 3 is terminated at step 108, the transfer of one line of data is terminated and whether X counter 45 has become "0" is determined. If X counter 45 is "0", the program proceeds to step 115 which will later be described, and if X counter 45 is not "0", the program proceeds to step 109 and the value of D address counter 52 is counted up to write into the rectangular area 3 the data of the least significant 4 bits set at S register 20, and the S signal to SEL 60 of the expansion unit 21 is controlled to "1", and 8-bit data is produced from the data of the least significant 4 bits of S register and is output from the selector unit 23 to the shift unit 25, and the aforementioned subroutine CALL 1 is called and the data is written into (D address register) address, and subsequently, at step 111, whether X counter 45 is "0" is examined. If X counter 45 is not "0", the program proceeds to step 112 and S address counter 42 is counted up by one and subsequently, at step 112, D address counter 52 is counted up by one and the program returns to step 105.

When at steps 108 and 111, the value of X counter 45 is judged as "0" and the transfer of the data of the lateral length (X) portion is terminated, the program proceeds to step 115 and Y counter 47 is counted down by one. At step 116, whether Y counter 47 is "0" is examined. If Y counter 47 is "0", the transfer of all data is terminated and thus, the data transfer process is terminated.

When the data transfer is not terminated, Y counter 47 assumes a positive value and the program proceeds to step 117, and the values of D address register 51 and DP register 54 are added together by D adder 53 and again set at D address register 51. Thereby, the first address of the next line of the rectangular area 3 is set at D address register 51. At step 118, whether the flag is "0" is examined and, if the flag is "0", the program proceeds to step 119 and the flag is set to "1", and then the program returns to step 104. This is because, in the case of the expansion process, it is necessary to repetitively write the data of one line of the rectangular area 2 into the rectangular area 3 in order that the data of the rectangular area 2 may be increased by (2×2) times and written into the rectangular area 3.

If, at step 118, the flag is not "0", the program proceeds to step 120 and the value of S address register 41 and the value of SP register 49 are added together by S adder 43 and again set at 4. S address register 41. Thereby, the first address of the next line of the rectangular area 2 is set at S address register 41. Then the program proceeds to step 121 and the flag is set to "0", and the program returns to step 104.

By the above-described process, when for example the data shown in FIG. 15A has been set at the rectangular area 2, the data shown in FIG. 15C is transferred to and set at the rectangular area 3.

The contraction process will now be described by reference to the contraction process flow chart of FIG. 17.

First, at step 151, contraction unit 22 is selected and control is effected so that the data from contraction unit 22 is output from selector unit 23, and the flag is set to "0" and the program proceeds to step 152 and, as at the aforementioned step 102, a fixed value is set at each register. Subsequently, at step 153, as at step 103, the value of Y register 46 is set at Y counter and, at step 154, as at step 104, the value of the remaining register is set at each counter and, at step 155, as at step 105, the content of (S address counter) address is set at S register.

At step 156, of the values of 8 bits of S register 20, the values of "0", "2", "4" and "6" bits, total 4 bits, are set at the hold register 62 and are output as the data of the most significant 4 bits of the output data from the contraction unit 22 to the selector unit 23. Subsequently, at step 157, the value of S address counter 42 is counted up by one and, at step 158, the content of (S address counter) address is set at S register 20.

The 0th, 2nd, 4th and 6th bits of the data set at S register 20 are combined with the data of the most significant 4 bits set as the data of the least significant 4 bits of the input to the selector unit 23 at the hold register 62 at step 156, and are input to the selector unit 23 and are output from the selector unit 23 to the shift unit 25. Then the subroutine CALL 1 is called and various processes are effected at (D address counter) address, whereafter the contracted transfer data is written thereinto. At step 160, whether X counter 45 is "0" is examined and if X counter 45 is not "0", the program proceeds to step 161 and S address counter 42 is counted up and, at step 162, D address counter is counted up, and the program returns to step 155.

If, at step 160, X counter 45 is "0", the transfer of the data of one line is terminated and therefore, at step 163, the value of Y counter 47 is counted down by one and, at step 164, whether Y counter 47 is "0" is examined. If Y counter 47 is not "0", the program proceeds to step 165 and as at the aforementioned step 117, the first address of the next line is set at D address register 51 and subsequently, at step 166, as at the aforementioned step 120, S address register 41 is set at the first address of the next line and, at step 167, it is set at the top address of the further next line. This is for the purpose of making the data of every other bit effective in the case of the contraction process. Then, the program returns to step 154 and the transfer of the next data is effected.

If, at step 164, Y counter 47 is "0", the transfer of all data is terminated and thus, the process is terminated.

As described above, by adding more or less steps and a hard circuit to the procedure of effecting data transfer, it becomes possible to transfer data while processing the data during a processing time equal to the transfer processing time. As the method of processing data, there would also occur to mind other method than the example described above, and 3×3 times, ⅓×⅓, etc. are possible by a similar process.

Also, as regards the transfer of data, an entirely similar operational effect can of course be obtained not only between identical memory units but also between different memory units.

According to the present invention, as described above, there can be provided a data transfer system in which the expansion and contraction processes are made possible at a time when a particular memory area of the memory unit is transferred to other memory area, whereby processing of data can be accomplished within a shorter process time, i.e., a process time substantially equal to the transfer time, and which is very efficient by being used for the output data or the like to an output device.

What I claim is:

1. A data transfer system comprising:

memory means having a plurality of memory positions for storing image data;

first address means for generating a first address for designating a first one of said memory positions in a first area in said memory means;

second address means for generating a second address for designating a second one of said memory positions in a second area in said memory means;

reading means for reading image data from the first area designated by the first address means;

writing means for writing the read image data to the second area designated by the second address means;

checking means for checking whether or not the first address of the first area and the second address of the second area have a portion in common; and control means for controlling said first address means to firstly generate the first address of the common portion of the first address when the first address and the second address have the common portion and to firstly generate a start address of the first area when the first address and the second address do not have the common portion.

2. A data transfer system according to claim 1, wherein said memory means comprises a plurality of memory areas storing data comprising one or more bits.

3. A data transfer system according to claim 1, wherein said first address means comprises an area for storing information on the magnitude of the information.

4. A data transfer system according to claim 1, wherein said first address means comprises a first counter and said second address means comprises a second counter.

5. A data transfer system according to claim 4, wherein said first counter comprises a vertical directional counter and said second counter comprises a lateral directional counter.

6. A data transfer system according to claim 1, wherein said first area and said second area are each rectangular in shape.

7. A data transfer system according to claim 6, wherein each of said first rectangular area and said second rectangular area are defined by a vertical length and a lateral length.

8. A method for use in a data transfer system, comprising the steps of:

storing image data in a memory means having a plurality of memory positions;

generating a first address for designating a first one of the memory positions in a first area in the memory means;

generating a second address for designating a second one of the memory positions in a second area in the memory means;

reading image data from the first area designated by the first address;

writing the read image data to the second area designated by the second address means;

checking whether or not the first address of the first area and the second address of the second area have a portion in common; and controlling generation of the first address to firstly generate the first address of the common portion of the first address when the first address and the second address have the common portion and to firstly generate a start address of the first area when the first address and the second address do not have a common portion.

9. A method according to claim 8, wherein said step of generating a first address uses a first counter and said step of generating a second address means uses a second counter.

10. A method according to claim 9, wherein the first counter comprises a vertical directional counter and the second counter comprises a lateral directional counter.

11. A method according to claim 8, wherein the first area and the second area are each rectangular in shape.

12. A method according to claim 11, wherein each of the first rectangular area and the second rectangular area are defined by a vertical length and a lateral length.

13. A memory medium storing program code for causing a programmable apparatus to execute a method that comprises the steps of:

storing image data in a memory means having a plurality of memory positions;

generating a first address for designating a first one of the memory positions in a first area in the memory means;

generating a second address for designating a second one of the memory positions in a second area in the memory means;

reading image data from the first area designated by the first address;

writing the read image data to the second area designated by the second address means;

checking whether or not the first address of the first area and the second address of the second area have a portion in common; and controlling generation of the first address to firstly generate the first address of the common portion of the first address when the first address and the second address have the common portion and to firstly generate a start address of the first area when the first address and the second address do not have a common portion.

14. A memory medium according to claim 13, wherein said step of generating a first address uses a first counter and said step of generating a second address means uses a second counter.

15. A memory medium according to claim 14, wherein the first counter comprises a vertical directional counter and the second counter comprises a lateral directional counter.

16. A memory medium according to claim 13, wherein the first area and the second area are each rectangular in shape.

17. A memory medium according to claim 16, wherein each of the first rectangular area and the second rectangular area are defined by a vertical length and a lateral length.

* * * * *

UNITED STATES PATENT AND TRADEMARK OFFICE
CERTIFICATE OF CORRECTION

PATENT NO. : 6,101,572
DATED : August 8, 2000
INVENTOR(S) : Takashi Minakawa

It is certified that error appears in the above-identified patent and that said Letters Patent is hereby corrected as shown below:

Sheet 5,
Fig. 7, "CL REGISTER" should read -- C REGISTER --.

Column 1,
Line 18, "toward" should be deleted.

Column 2,
Line 23, "vertically" should read -- vertically is to be moved --;
Line 24, "is to" should be deleted;
Line 25, "be moved" should be deleted;
Line 66, "with" should read -- with the --.

Column 3,
Line 35, "process" should read -- process and --.

Column 4,
Line 9, "last" should read -- lost --;
Line 12, "position" should read -- portion --.

Column 5,
Line 14, "FIG. 3, a" should read -- FIG. 3a, --;
Line 30, "content" should read -- contents --.

Column 6,
Line 8, "SELL" should read -- SEL 1 --.

Column 7,
Line 28, "directly" should read -- directly outputting --.

Column 8,
Line 41, "of" (second occurrence) should be deleted;
Line 59, "unit [ ] at" should read -- units at --.

Column 9,
Line 13, close up right margin;
Line 14, close up left margin;
Line 20, "step 113" should read -- step 113, --;
Line 37, "complement 25" should read -- complement --;

UNITED STATES PATENT AND TRADEMARK OFFICE
CERTIFICATE OF CORRECTION

PATENT NO.   : 6,101,572
DATED        : August 8, 2000
INVENTOR(S)  : Takashi Minakawa It is certified that error appears in the above-identified patent and that said Letters Patent is hereby corrected as shown below:

Column 9,
Line 39, "top" should be deleted;
Line 47, "case" should read -- case, --;
Line 65, "top" should read -- first --;
Line 67, "begins" should read -- begin --.

Column 10,
Line 41, "bit" should read -- bit, --.

Column 11,
Line 38, "the" (first occurrence) should be deleted;
Line 59, "terminated at" should read -- terminated. At --.

Column 12,
Line 5, "0 "is" should read -- "0" is --;
Line 34, "at 4." should read -- at --.

Column 13,
Line 18, " top" should read -- first --;
Line 29, "method" should read -- methods --.

Signed and Sealed this

Sixteenth Day of October, 2001

Attest:

*Nicholas P. Godici*

NICHOLAS P. GODICI
*Acting Director of the United States Patent and Trademark Office*

*Attesting Officer*